US008817369B2

(12) United States Patent
Daiku

(10) Patent No.: US 8,817,369 B2
(45) Date of Patent: Aug. 26, 2014

(54) THREE DIMENSIONAL DISPLAY DEVICE AND METHOD OF CONTROLLING PARALLAX BARRIER

(75) Inventor: Yasuhiro Daiku, Saitama (JP)

(73) Assignee: Samsung Display Co., Ltd., Yongin (KR)

( * ) Notice: Subject to any disclaimer, the term of this patent is extended or adjusted under 35 U.S.C. 154(b) by 233 days.

(21) Appl. No.: 12/858,380

(22) Filed: Aug. 17, 2010

(65) Prior Publication Data

US 2011/0051239 A1   Mar. 3, 2011

(30) Foreign Application Priority Data

Aug. 31, 2009   (JP) .................................. 2009-199684

(51) Int. Cl.
*G02B 27/22*   (2006.01)
*G02B 27/10*   (2006.01)

(52) U.S. Cl.
USPC .......................................... 359/464; 359/618

(58) Field of Classification Search
USPC ......... 359/464, 237, 245–246, 248–254, 256, 359/279, 320, 618; 345/32–33; 348/40–42
See application file for complete search history.

(56) References Cited

U.S. PATENT DOCUMENTS

| 5,917,539 | A | * | 6/1999 | Sorensen et al. ................. 348/56 |
| 6,049,424 | A | | 4/2000 | Hamagishi |
| 2004/0150728 | A1 | * | 8/2004 | Ogino ............................ 348/239 |
| 2006/0114415 | A1 | * | 6/2006 | Shestak et al. ..................... 353/7 |
| 2008/0024598 | A1 | * | 1/2008 | Perlin et al. ...................... 348/55 |
| 2010/0060983 | A1 | * | 3/2010 | Wu et al. ......................... 359/466 |
| 2010/0171697 | A1 | * | 7/2010 | Son et al. ....................... 345/158 |

FOREIGN PATENT DOCUMENTS

| JP | 9-197344 | A | 7/1997 |
| JP | H10-174127 | A | 6/1998 |
| JP | H11-085095 | A | 3/1999 |
| JP | 2001166259 | A | 6/2001 |
| JP | 2008-164899 | A | 7/2008 |
| JP | 2008-294530 | A | 12/2008 |
| WO | 2008/081887 | A1 | 7/2008 |

OTHER PUBLICATIONS

Japanese Office Action dated Aug. 16, 2011, in a counterpart Japanese patent application No. 2009-199684.
Korean Office Action dated Dec. 6, 2011, in a counterpart Korean patent application No. 10-2010-0085004.
Japanese Office Action dated Apr. 17, 2012, in a counterpart Japanese Patent Application No. 2009-199684.

* cited by examiner

*Primary Examiner* — Dawayne A Pinkney
(74) *Attorney, Agent, or Firm* — Jefferson IP Law, LLP

(57) ABSTRACT

A three-dimensional display device includes a display unit that displays a left eye image and a right eye image by dividing the images thereof into a plurality of vertically elongated stripes of images and by alternately arranging the divided left eye image and the divided right eye image in a horizontal direction, a barrier formation unit that forms a parallax barrier in front of the display unit, the parallax barrier including a pattern of a plurality of slits to selectively transmit the left eye image and the right eye image towards spatially different points, respectively, that correspond to a left eye and a right eye of the viewer, and a distance measurement unit that measures a distance between the display unit and a viewer viewing the display unit, wherein the barrier formation unit changes the pattern of the slits in the parallax barrier in accordance with the distance measured by the distance measurement unit.

17 Claims, 16 Drawing Sheets

NORMAL IMAGE

RIGHT EYE IMAGE

LEFT EYE IMAGE

| VISIBLE DISTANCE LEVEL | SLIT WIDTH | BARRIER WIDTH |
|---|---|---|
| L1 (SMALLEST) | W1 (SMALLEST) | B1 (LARGEST) |
| L2 | W2 | B2 |
| L3 | W3 | B3 |
| Ln-2 | Wn-2 | Bn-2 |
| Ln-1 | Wn-1 | Bn-1 |
| Ln (LARGEST) | Wn (LARGEST) | Bn (SMALLEST) |

FIG. 9
CONDITION I : VISIBLE DISTANCE LEVEL = HIGHEST
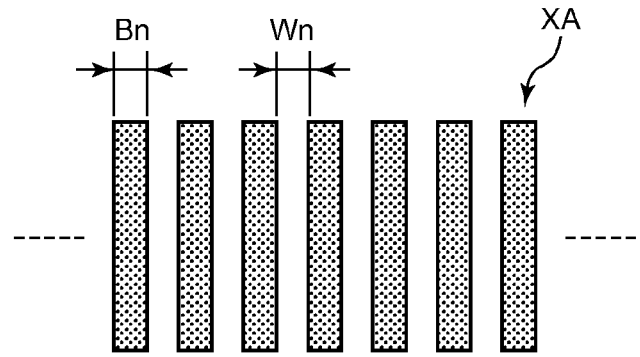
CONDITION II : VISIBLE DISTANCE LEVEL = INTERMEDIATE
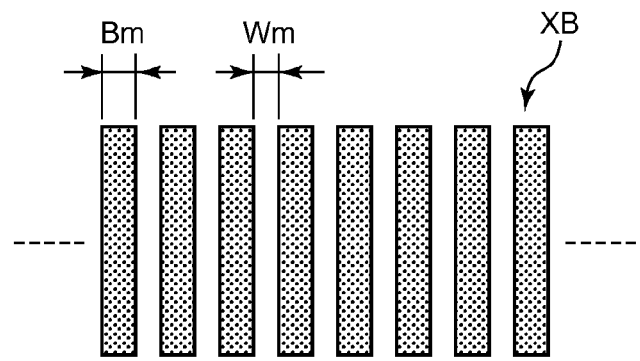
CONDITION III : VISIBLE DISTANCE LEVEL = LOWEST
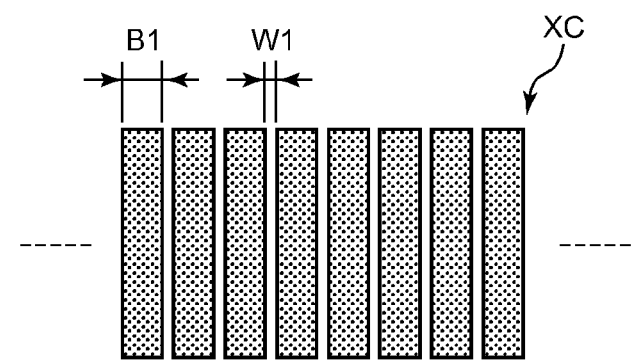

FIG. 10
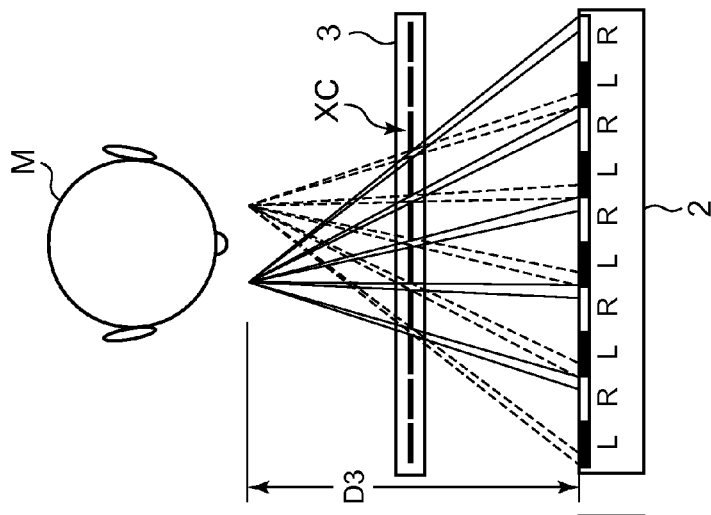
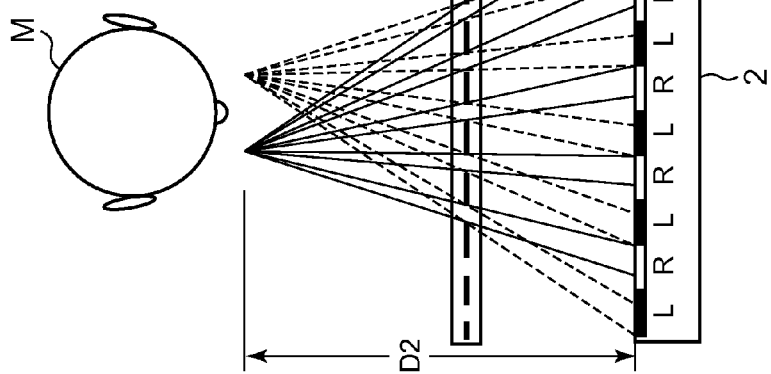
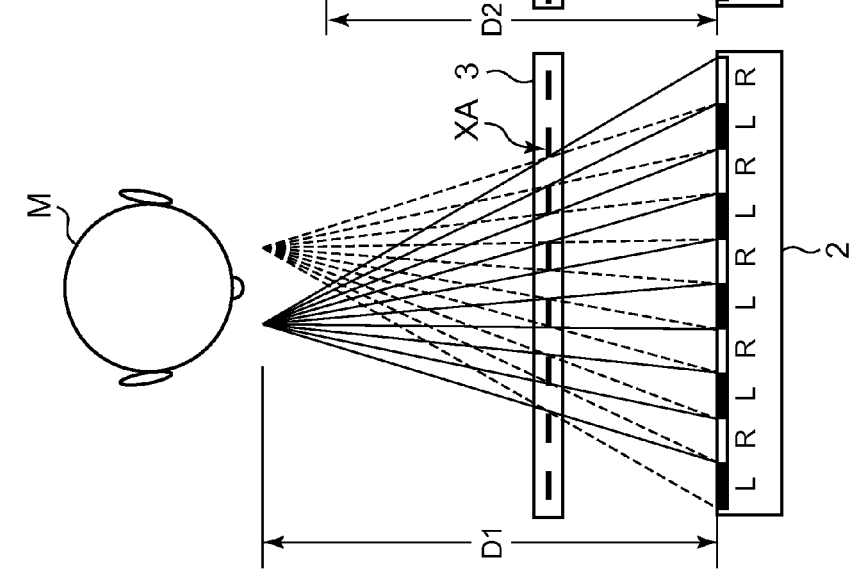

FIG. 11

| REGISTRATION NUMBER | FACE IMAGE DATA | OFFSET DISTANCE |
|---|---|---|
| 1 | | ...... |
| 2 | | ...... |
| 3 | | ...... |

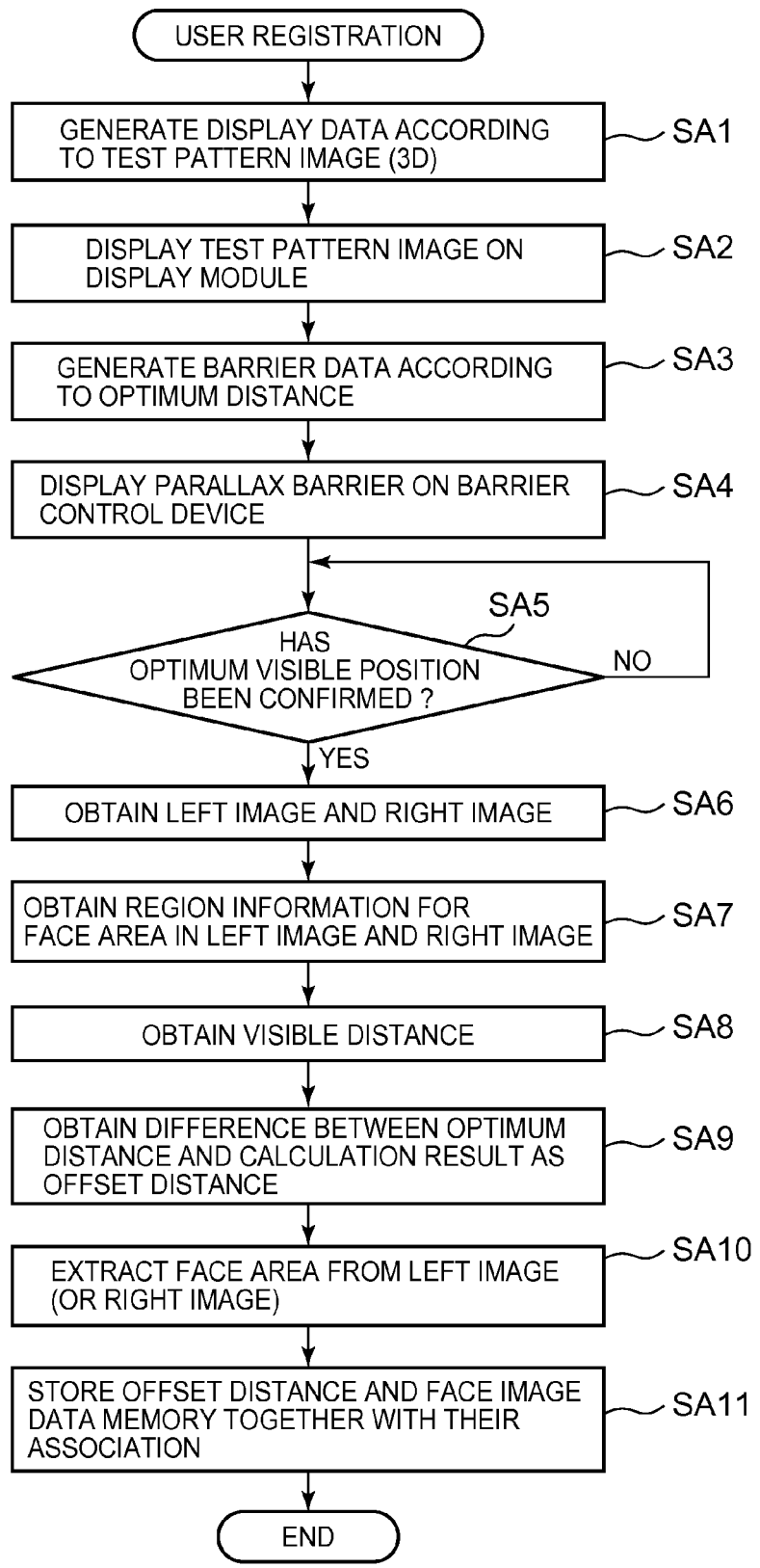

THREE DIMENSIONAL DISPLAY DEVICE AND METHOD OF CONTROLLING PARALLAX BARRIER

CROSS-REFERENCE TO RELATED APPLICATIONS

This application is based upon and claims the benefit of priority from prior Japanese Patent Application No. 2009-199684, filed Aug. 31, 2009, the entire contents of which are hereby incorporated by reference.

BACKGROUND OF THE INVENTION

1. Field of the Invention

The present invention relates to three dimensional display apparatus, and more specifically, to display apparatus and display method for displaying three-dimensional images using a parallax barrier system.

2. Description of the Related Art

Conventionally, a parallax barrier system has been known as a method for achieving a display of three-dimensional images without using special glasses. A display device using a parallax barrier system mainly includes a display device that displays a left eye image and a right eye image alternately every each vertical line, and a parallax barrier that is placed in front of the display device that selectively shades light emitted by the display device. Such a display device allows a viewer to view a three-dimensional image by making the left eye image visible only to the left eye of the viewer and the right eye image visible only to the right eye of the viewer through slits formed between each barrier of the parallax barrier.

For example, Laid-open Japanese Patent Application No. 9-197344 discloses a display device in which barriers extending vertically are arranged at a regular interval using a liquid crystal panel to form a parallax barrier between a liquid crystal display (LCD) panel and a backlight. Further, the parallax barrier can be moved in a lateral direction in a designated amount (barrier movement). In such a structure, enlarging a visible range of a three-dimensional image in a lateral direction of the LCD panel is possible by optimally controlling the barrier movement as well as the switching between the right eye image and the left eye image displayed on the LCD panel.

However, in the conventional structure mentioned above, there are problems in that while a visible range of three-dimensional images in a lateral direction can be enlarged, a three-dimensional view is not possible when the distance between the viewer's eyes and the displayed image (such as the LCD panel) deviates from a predetermined preprogrammed distance. This is because an area on the LCD panel at which the right eye image is displayed does not completely correspond to an area on the LCD panel that can be viewed by the viewer's right eye through slits of the parallax barrier, and, in a similar manner, an area on the LCD panel at which the right eye image is displayed does not completely correspond to an area on the LCD panel that can be viewed by the left eye of the viewer.

SUMMARY OF THE INVENTION

Accordingly, the present invention is directed to a display device and a method for displaying images three-dimensionally that substantially obviate one or more of the problems due to limitations and disadvantages of the related art.

An object of the present invention is to provide a three-dimensional display device and a method for displaying images three-dimensionally with improved viewability.

Another object of the present invention is to enlarge the range of the viewing distance between a viewer and a displayed image at which the viewer can view the image three-dimensionally.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides, in one aspect, a display device including a display unit that displays a left eye image and a right eye image by dividing the images thereof into a plurality of vertically elongated stripes of images and by alternately arranging the divided left eye image and the divided right eye image in a horizontal direction, a barrier formation unit that forms a parallax barrier in front of the display unit, a distance information acquisition unit that derives distance information indicating a distance between the display unit and a viewer viewing the display unit, and a slit width control unit that controls a slit width of the parallax barrier formed by the barrier formation unit in accordance with said distance indicated by the distance information obtained by the distance information acquisition unit.

In another aspect, the present invention provides a display device including a display unit displaying a left eye image and a right eye image by dividing the images thereof into a plurality of vertically elongated stripes of images and by alternately arranging the divided left eye image and the divided right eye image in a horizontal direction, a barrier formation unit forming a parallax barrier in front of the display unit, a memory unit that stores a registered image of a preregistered user including at least a face area and correction information for the preregistered user, an imaging unit that takes an image of a viewer as a subject, an identification unit that identifies whether or not the viewer is the preregistered user by performing a face recognition processing including a comparison between the face area of the viewer on the subject image taken by the imaging unit and the registered image stored in the memory unit, a readout unit that reads out from the memory unit the correction information for the viewer identified by the identification unit as the preregistered user, and a slit width control unit that controls a slit width of the parallax barrier formed by the barrier formation unit in accordance with the correction information read out by the readout unit.

In another aspect, the present invention provides a display device including a display unit displaying a left eye image and a right eye image by dividing the images thereof into a plurality of vertically elongated stripes of images and by alternately arranging the divided left eye image and the divided right eye image in a horizontal direction, a barrier formation unit forming a parallax barrier in front of the display unit, a distance information acquisition unit obtaining distance information indicating a distance between the display unit and a viewer viewing the display unit, and a barrier pattern control unit controlling a barrier pattern of the parallax barrier formed by the barrier formation unit to be at a designated barrier pattern having the slit width corresponding to the distance indicated by the distance information obtained by the distance information acquisition unit.

In another aspect, the present invention provides a display device including a display unit displaying a left eye image and a right eye image by dividing the images thereof into a plurality of vertically elongated stripes of images and by alternately arranging the divided left eye image and the divided right eye image in a horizontal direction, a barrier formation unit that forms a parallax barrier in front of the display unit, a distance information acquisition unit that obtains distance information indicating a distance between the display unit and a viewer viewing the display unit, and a barrier width control unit that controls a barrier width of the parallax barrier formed by the barrier formation unit to be at the barrier width for the distance indicated by the distance information obtained by the distance information acquisition unit.

In another aspect, the present invention provides a method for controlling a parallax barrier for a three dimensional display, including obtaining distance information indicating a distance between a display unit that displays a left eye image and a right eye image by dividing the images thereof into a plurality of vertically elongated stripes and by alternately arranging the divided left eye image and the divided right eye image in a horizontal direction, and a viewer viewing the display unit, and controlling a slit width of a parallax barrier formed in front of the display unit according to the distance indicated by the distance information.

In another aspect, the present invention provides a three-dimensional display device including a display unit that displays a left eye image and a right eye image by dividing the images thereof into a plurality of vertically elongated stripes of images and by alternately arranging the divided left eye image and the divided right eye image in a horizontal direction, a barrier formation unit that forms a parallax barrier in front of the display unit, the parallax barrier including a pattern of a plurality of slits to selectively transmit the left eye image and the right eye image towards spatially different points, respectively, that correspond to a left eye and a right eye of a viewer viewing the display unit, and a distance measurement unit that measures a distance between the display unit and the viewer, wherein the barrier formation unit changes the pattern of the slits in the parallax barrier in accordance with the distance measured by the distance measurement unit.

In another aspect, the present invention provides a three-dimensional display device including a display unit that displays a left eye image and a right eye image by dividing the images thereof into a plurality of vertically elongated stripes of images and by alternately arranging the divided left eye image and the divided right eye image in a horizontal direction, a barrier formation unit that forms a parallax barrier in front of the display unit, the parallax barrier including a pattern of a plurality of slits to selectively transmit the left eye image and the right eye image towards spatially different points, respectively, that correspond to a left eye and a right eye of the viewer, and a distance measurement unit that measures a distance between the display unit and a viewer viewing the display unit, wherein at least one of a distance between the barrier formation unit and the display unit and the pattern of the slits in the parallax barrier is adjusted in accordance with the distance to the viewer measured by the distance measurement unit.

According to the present invention, it is possible to realize a three-dimensional view of a displayed image while enlarging a range of the distance between the viewer and the displayed image.

It is to be understood that both the foregoing general description and the following detailed description are exemplary and explanatory and are intended to provide further explanation of the invention as claimed.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 8 is a conceptual diagram showing a barrier pattern acquisition table.

FIG. 9 is an illustration showing examples of a barrier pattern.

FIG. 10 is an illustration showing the relationship between a parallax barrier and lines of sight of the viewer for different visible distances.

FIG. 11 is a conceptual diagram showing user registration information.

FIG. 12 is a flowchart showing a user registration processing.

DETAILED DESCRIPTION OF THE INVENTION

Figure 1:
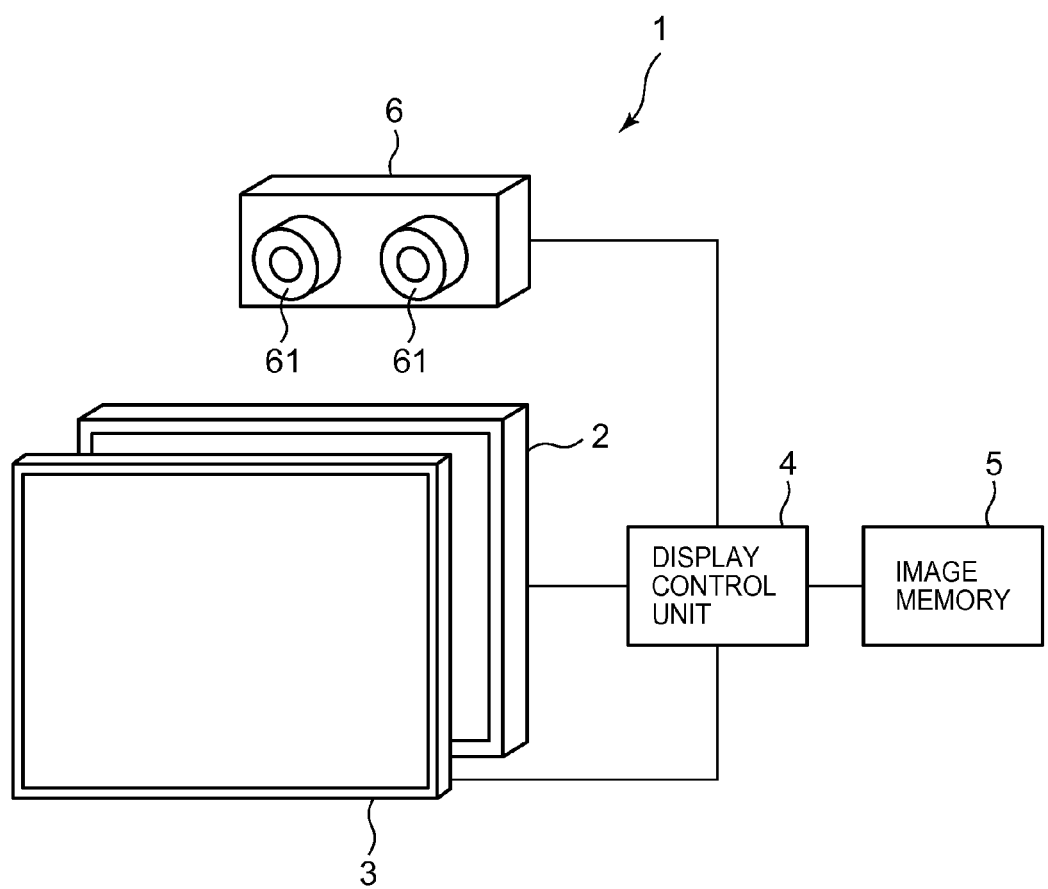
FIG. 1 is an illustration showing a configuration example of a display device to which the present invention is applied.

A preferred embodiment of the present invention is described as follows. FIG. 1 is an illustration showing a schematic configuration of a display device 1 presented as an example of a preferred embodiment of the present invention. The display device 1 realizes a display of a three-dimensional image using a parallax barrier system and, as shown in FIG. 1, includes a display module 2, a barrier control device 3 arranged in front of the display module 2, a display control unit 4, an image memory 5, and a stereo camera unit 6.

The display module 2 is a display device to display prepared images, such as a normal image, or a pair of a left eye image and a right eye image to be recognized as a three-dimensional image by a viewer, thereby functioning as a display unit of the present embodiment. Here, the word "image" is used synonymously with a word "picture" and indicates still images or moving images. Also, in the following description, the aforementioned normal image is referred to as a 2D (two-dimensional) image, and the pair of the left eye image and the right eye image is referred to as a 3D (three-dimensional) image.

The display module 2 is a transmissive type or self light emitting type display device, which has display elements (hereinafter referred to as sub-pixels) such as liquid crystal elements, EL (Electroluminescence) elements, and so forth, and also is a dot matrix type display device in which a large number of display elements are arranged in both vertical and horizontal directions. For each sub-pixel of the display module 2, one of three colors including red (R), green (G), and blue (B), is respectively allocated using a color filter, for example, according to a predetermined color pattern.

Figure 3A:
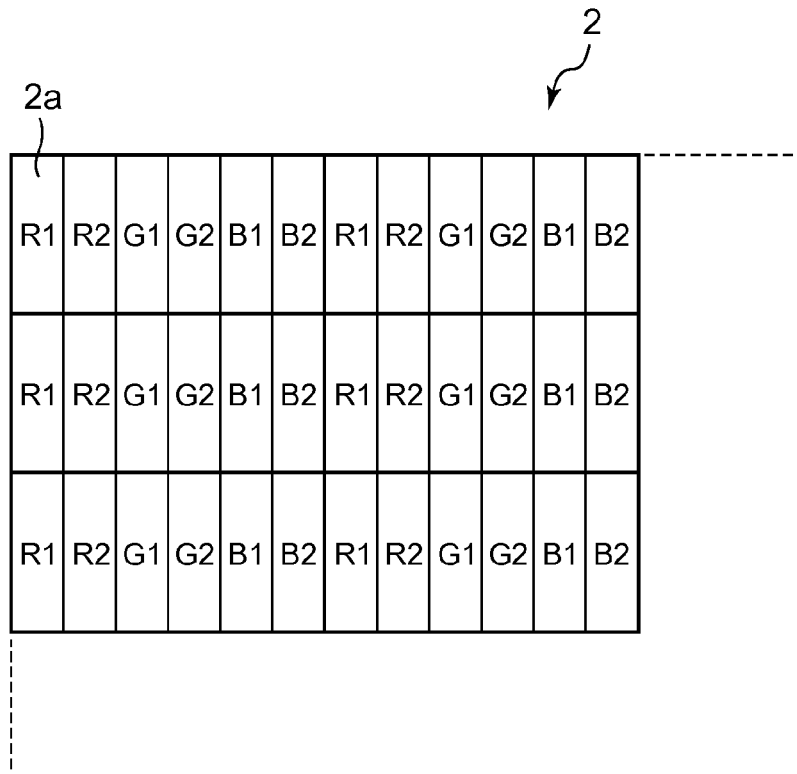
FIG. 3A is a schematic view of a color pattern of pixels of the display module.

However, in the display module 2, a color combination for each sub-pixel 2a is different from that of the standard dot matrix type display device, as shown in FIG. 3A. That is, for each sub-pixel of the display module 2, the same color is assigned to two horizontally-adjacent sub-pixels, namely, 2a, 2a. In other words, as shown in the FIG. 3A, red (R) is assigned to two sub-pixels 2a, 2a indicated as R1, R2, green (G) to two sub-pixels 2a, 2a indicated as G1, G2, and blue (B) to two sub-pixels 2a, 2a indicated as B1, B2.

Figure 4A:
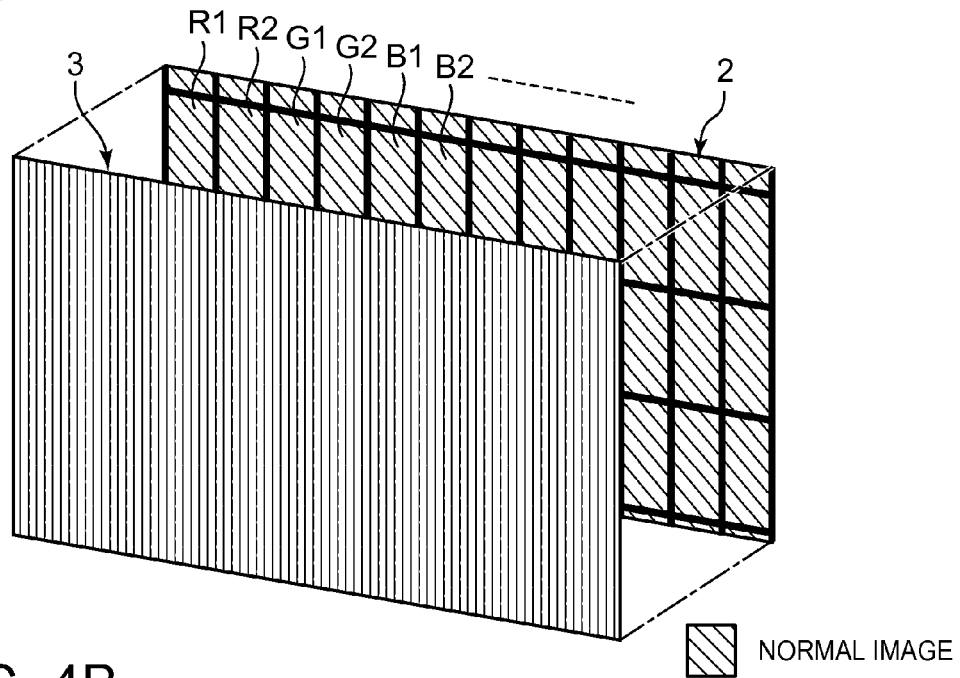
FIG. 4A is an illustration showing a display of a two-dimensional (2D) image.

Therefore, in order to color-display a 2D image on the display module 2, six sub-pixels 2a, namely, R1, R2, G1, G2, B1, B2, are grouped as a set; one pixel of the 2D image is assigned to each such set of the sub-pixels; and based on a RGB space partitioning method, color-displaying of a 2D image on the entire screen of the display module 2 becomes possible, as shown in FIG. 4A. In other words, according to the display module 2, color-displaying of a 2D image is possible by controlling a gradation level (brightness level) of respective sets of the sub-pixels, each comprising R1, R2, G1, G2, B1, B2, according to the color of the pixel of the 2D image to which the set of the sub-pixels is corresponding, and at the same time, by maintaining the same gradation level for each pair of two adjacent sub-pixels 2a, 2a in the set to which the same color is assigned.

Figure 4B:
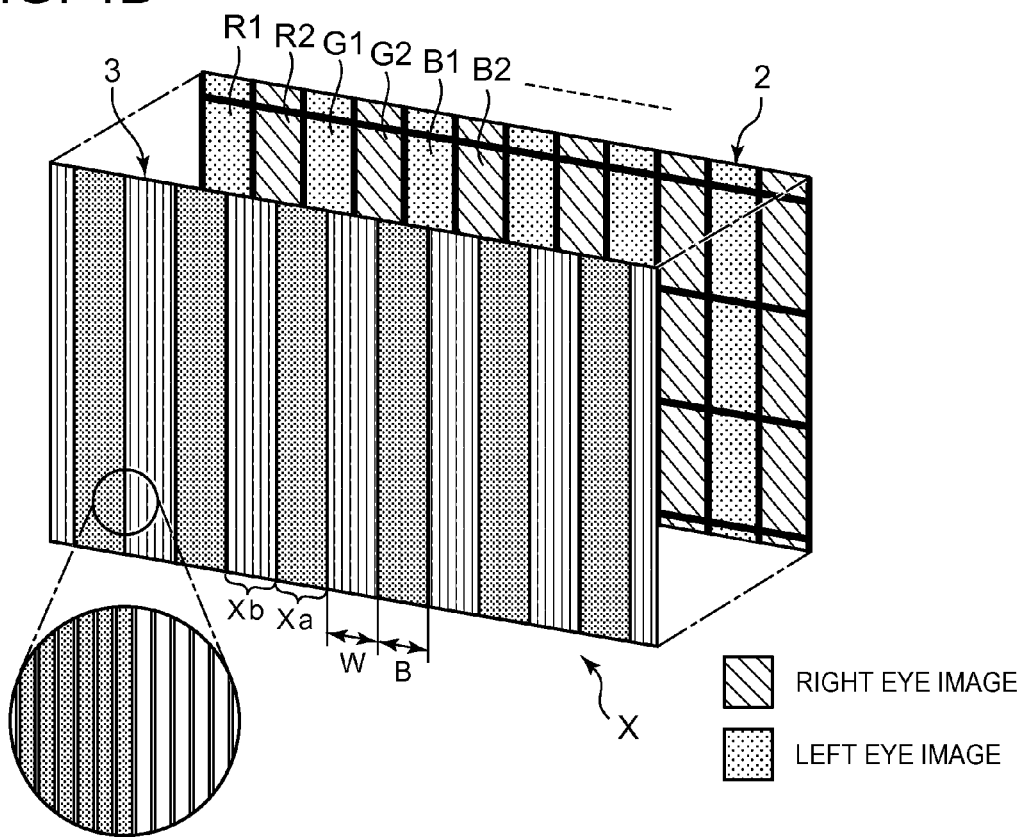
FIG. 4B is an illustration showing a display of a three-dimensional (3D) image and a parallax barrier.

Further, in the display module 2, a color-display of a 3D image is possible by a method described below. As shown in FIG. 4B, a right eye image and a left eye image are divided into vertically elongated stripes, which are then alternately arranged at every sub-pixel 2a in the horizontal direction. More specifically, a subset of three sub-pixels 2a with three different colors, which are arranged horizontally with one sub-pixel in between—namely, R1, G1, B1 shown in FIG. 3A—correspond to one pixel of the right eye image (or the left eye image). Also, one pixel of the left eye image (or the right eye image) corresponds to the other subset of three sub-pixels 2a in three different colors, namely, R2, G2, B2 as shown in the FIG. 3A, which are arranged horizontally with one sub-pixel in between. And, based on the RGB space partitioning method, the gradation level of one subset of three sub-pixels 2a in three different colors (R1, G1, B1) is controlled according to the color of one corresponding pixel of the right eye image (or the left eye image), and at the same time, the gradation level of the other subset of three sub-pixels 2a in three different colors (R2, G2, B2) is controlled according to the color of one corresponding pixel of the right eye image (or the left eye image).

The barrier control device 3 is a device for forming a parallax barrier that selectively shades light emitted by the display module 2 when a 3D image (a right eye image and a left eye image) is displayed on the display module 2, thereby functioning as a barrier formation unit of the present embodiment.

Figure 2:
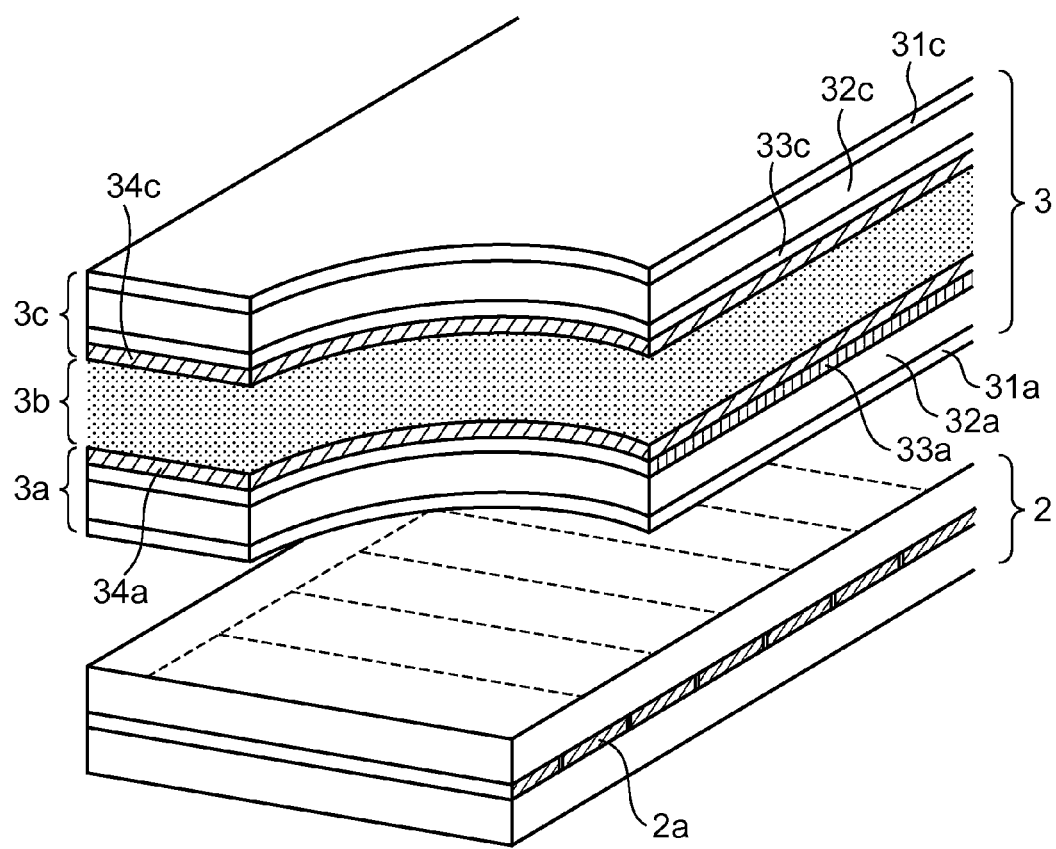
FIG. 2 is a partially enlarged perspective view of a display module and a barrier control device.

The barrier control device 3 is, for example, a static TN liquid crystal panel and includes a lower layer 3a, a liquid crystal layer 3b, and an upper layer 3c, as shown in FIG. 2. In the lower layer 3a, a polarizer 31a and a transparent substrate 32a are formed. On the top of the transparent substrate 32a, a plurality of stripe-shape transparent electrodes 33a are arranged in the horizontal direction of the display screen of the display module 2, and are coated with an alignment film 34a. Here, a plurality of the transparent electrodes 33a are arranged in the form of stripes at an arrangement pitch, which is finer than the horizontal arrangement pitch of the sub-pixels 2a in the display module 2. The upper layer 3c, which possesses a cross-sectional structure that is reversed with respect to the lower layer 3a, includes an alignment film 34c, a non-patterned film of transparent electrodes 33c, a transparent substrate 32c, and a polarizer 31c in that order as viewed from the lower layer side. The barrier control device 3 may alternatively be formed by a passive-type liquid crystal panel or active-type liquid crystal panel.

Additionally, although this is not shown in FIG. 2, lead wirings are drawn from the transparent electrodes 33a, 33c of the lower layer 3a and the upper layer 3c, respectively, and are connected to the transparent substrate 32a (or 32c) located on one side of the lower layer 3a (or the upper layer 3c). Further, a driver element, which drives liquid crystal of the liquid crystal layer 3b, is mounted on the above-mentioned transparent substrate 32a (or 32b) using a COG (Chip On Glass) method, for example.

Figure 3B:
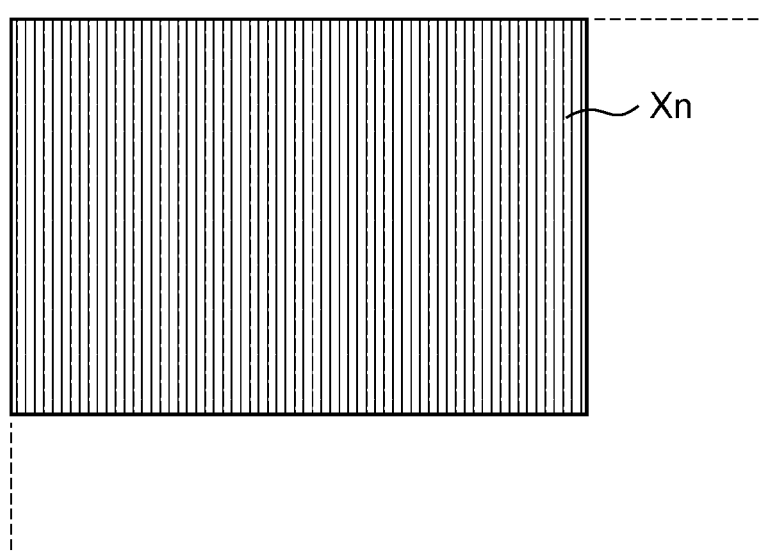
FIG. 3B is a schematic view of a barrier element.

The barrier control device 3 has two modes of operations. In a light transmissive mode, as a result of the above mentioned driver element driving the liquid crystal with predetermined drive signals via the transparent electrodes 33a, 33c, the liquid crystal layer 3b transmits the entire light emitted by the display module 2. In a barrier display mode, the liquid crystal layer 3b selectively displays a plurality of barrier elements Xn, which, as shown in FIG. 3B, extend in the vertical direction of the display screen of the display module 2 and are aligned in the horizontal direction of the display screen to partially shade the light emitted by the display module 2. Here, the barrier elements Xn respectively correspond to the transparent electrodes 33a that are arranged in the form of stripes, and can be regarded as display pixels for the barrier control device 3.

In other words, as shown in FIG. 4B, using the barrier elements Xn, the barrier control device 3 can display a parallax barrier X, which is constructed of barrier regions Xa, which has a light shading capability and are arranged at a fixed interval, and slit regions Xb, which are formed between barrier regions Xa and has light transmissibility. Further, the barrier control device 3 can also display a variety of barrier patterns in which the width B of the barrier regions Xa differs from the width W of the slit regions Xb.

Figure 5A:
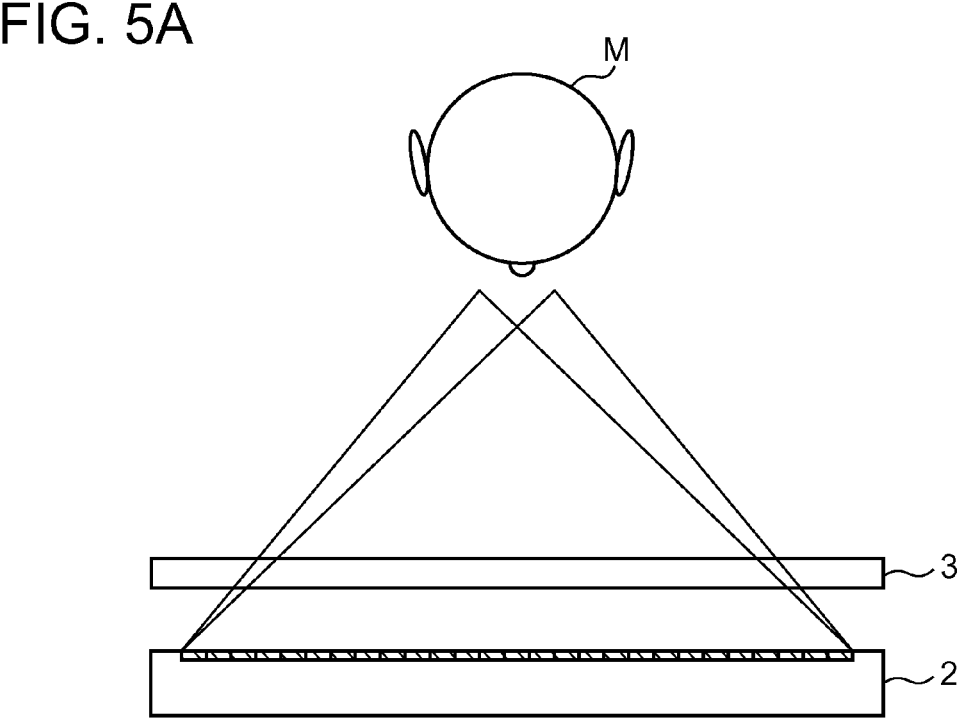
FIG. 5A is an illustration showing lines of sight when a 2D image is viewed.

Therefore, when a 2D image is to be displayed on the display module 2, the barrier control device 3 can be so controlled that the liquid crystal layer 3b is in the light transmissive mode, as shown in FIG. 4A, and the 2D image can be viewed by a viewer M through the barrier control device 3, as shown in FIG. 5A.

Figure 5B:
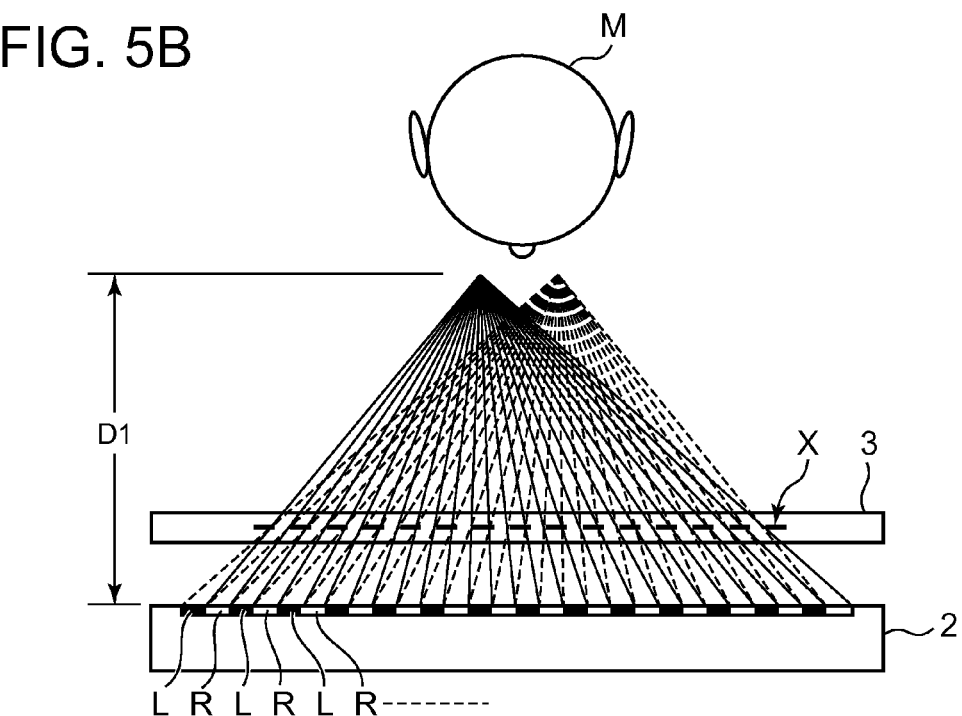
FIG. 5B is an illustration showing lines of sight when a 3D image is viewed.

In addition, when a 3D image is to be displayed on the display module 2, the barrier control device 3 can display a parallax barrier X as shown in FIG. 4B, and when the distance between the viewer M's eyes and the surface of the display module 2 matches the predetermined design distance, a right eye image and a left eye image can be separately viewed by the viewer M's left eye and right eye, respectively, through the slit regions Xb of the parallax barrier X, as shown in FIG. 5B. More specifically, pixels of the right eye image R are visible only to the viewer M's right eye, and pixels of the left eye image L are visible only to the viewer M's left eye. As a result, the 3D image can be viewed three-dimensionally by the viewer M using a binocular parallax.

The display control unit 4 controls the operations of the display module 2, the barrier control device 3, and the stereo camera unit 6. Details of the display control unit 4 are described later.

The image memory 5 is a memory in which data of one or more 2D and 3D images to be displayed on the display module 2 are stored. The image memory 5 may include, for example, RAM (Random Access Memory), ROM (Read Only Memory), HDD (Hard Disk Drive), a variety of memory cards, and/or a variety of removable disks.

The stereo camera unit 6 targets a user (viewer) of the display device 1 as a subject, and takes two images (a right image and a left image) having a horizontal parallax of the user at the same time. As shown in FIG. 1, the stereo camera unit 6 possesses two imaging lenses 61, 61.

Each of the imaging lenses 61, 61 has the same focal distance, and the stereo camera unit 6 is arranged relative to the display module 2 as described as follows. That is, the stereo camera unit 6 is so arranged that its two imaging lenses 61, 61 are aligned on the same plane as the surface of the display module 2 (display screen) in the horizontal direction of the display screen of the display module 2, and also that the optic axis of each of the imaging lenses 61, 61 is perpendicular to the display module's surface.

Figure 6:
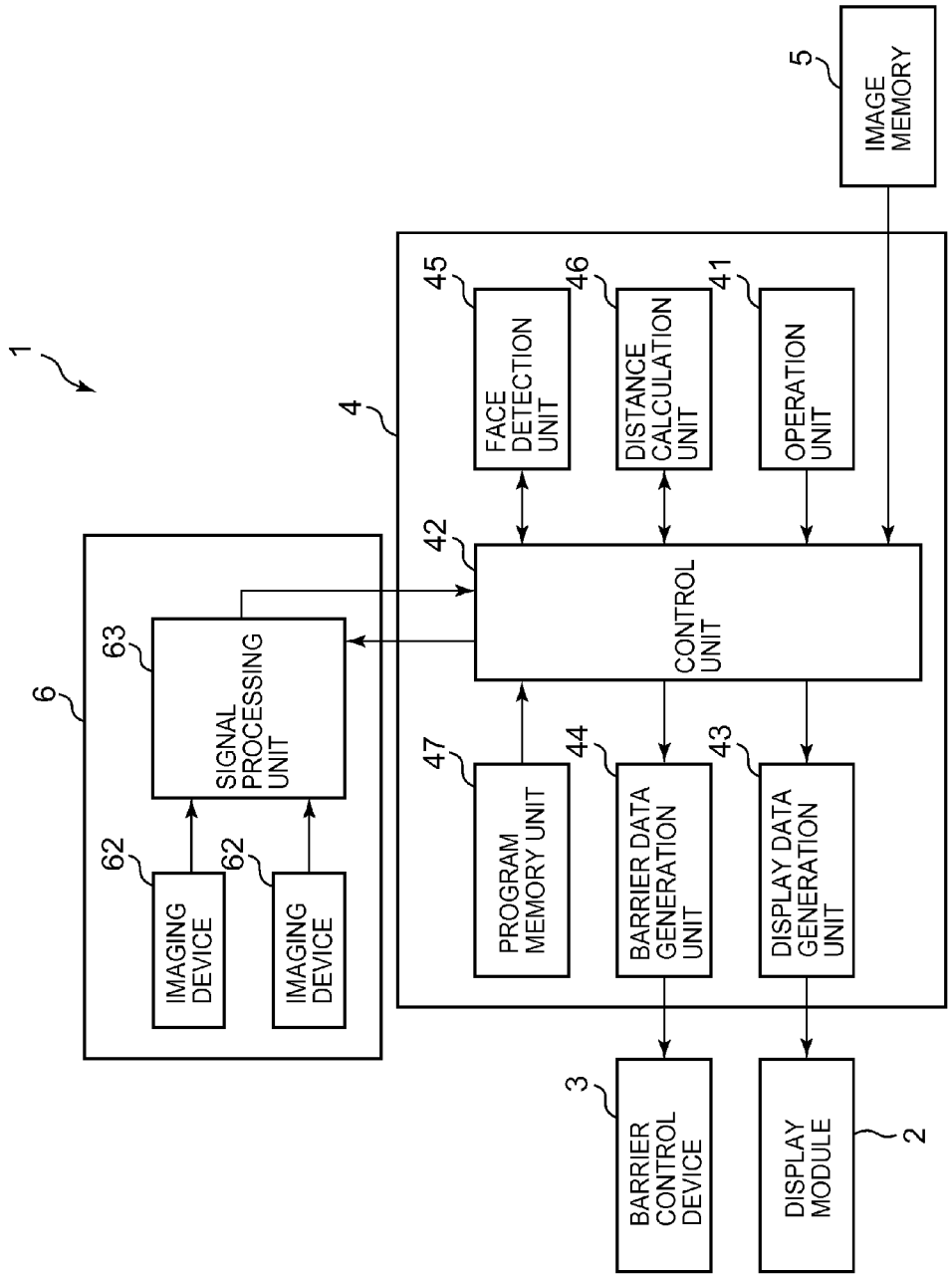
FIG. 6 is a block diagram outlining an exemplary electrical configuration of the display device.

FIG. 6 is a block diagram outlining an electrical configuration of the display device 1 according to the present embodiment. As shown in FIG. 6, the stereo camera unit 6 includes two imaging devices 62, 62 and a signal processing unit 63. The two imaging devices 62, 62 are, for example, CCD (Charge Coupled Device) type imaging devices or MOS (Complementary Metal Oxide Semiconductor) type imaging devices. The imaging devices 62, 62 convert an optical image of the subject, which is formed by each of the imaging lenses 61, 61 on an imaging surface (light sensitive surface), to electrical signals and provides the converted electrical signals, namely, imaging signals, to the signal processing unit 63.

The signal processing unit 63 includes, for example, AFE (Analog Front End), which contains CDS (Correlated Double Sampling), PGA (Programmable Gain Amp), and ADC (Analog-to-Digital Converter) for processing image signals provided by the two imaging devices 62, 62 and for converting such image signals into digital signals, and a DSP (Digital Signal Processor), which performs a designated digital signal processing on the imaging signals that have been converted to the digital signals.

The stereo camera unit 6 provides the imaging signals to which the signal processing unit 63 has performed the digital signal processing, that is, image data constructing respectively two images including the right image and the left image, to the display control unit 4, thereby functioning as an imaging unit of the present embodiment.

The display control unit 4 includes, as shown in FIG. 6, an operation unit 41, a control unit 42, a display data generation unit 43, a barrier data generation unit 44, a face detection unit 45, a distance calculation unit 46, and a program memory unit 47.

The operation unit 41 includes a plurality of switches or other user interface used by the user to initiate various processes, such as a selection process in which the user selects an image to be displayed on the display module 2 from the collection of images (2D or 3D images) stored in the image memory 5 as image data, and a registration process, in which the user stores below-described information related to one or more users registered in the display device 1 (user registration information 403 shown in FIG. 11) in the display control unit 4.

The control unit 42 includes CPU (Central Processing Unit) and its peripheral circuits, working memory for CPU, and so forth. The control unit 42 controls an operation of each of the units contained in the display control unit 4 as well as an operation of the stereo camera unit 6 by executing the designated control program based on the user's directions given through the operation of the switches of the operation unit 41. In addition, the control unit 42 reads out image data from the image memory 5.

The display data generation unit 43 generates display data, which are data needed to drive the display module 2 according to the image data read out by the control unit 42 from the image memory 5, and also provides the generated display data to the display module 2.

The barrier data generation unit 44 generates barrier data, which are needed to display a designated parallax barrier having a designated barrier pattern according to the pattern information provided by the control unit 42, and also provides the generated barrier data to the barrier control device 3. Details about the pattern information are described later.

The face detection unit 45 performs a face detection processing, in which a face of an arbitrary person is detected in the image data provided to the display control unit 4 by the stereo camera unit 6, that is, either or both of the right image and the left image of the taken image. The face detection processing detects the image's specific region having close characteristics of any of prepared (stored) model patterns of contours and colors of human faces. The face detection processing includes various steps of image processing, such as binarizing, contour extraction, pattern matching, and so forth. The face detection unit 45 provides coordinate information, which is detected through the face detection processing and indicates a specific region in either or both of the right image and the left image, to the control unit 42 as region information of the person's face. Note that the face detection unit 45 contains image processing circuits for performing various steps of image processing required for the face detection processing, a plurality of registers for storing parameters used in the face detection processing, working memories, and so forth.

The distance calculation unit 46 calculates a visible distance, which is a distance between the display module 2 and the viewer, based on the aforementioned region information provided by the face detection unit 45 to the control unit 42 with regard to both of the right image and the left image, and provides the calculated distance to the control unit 42. In other words, the distance information is derived from the aforementioned region information regarding both of the right image and the left image. In the display device 1, the stereo camera unit 6 and the face detection unit 45 together constitute a distance information acquisition unit of the present embodiment. Note that a method for calculating a visible distance by the distance calculation unit is described later.

Figure 7:
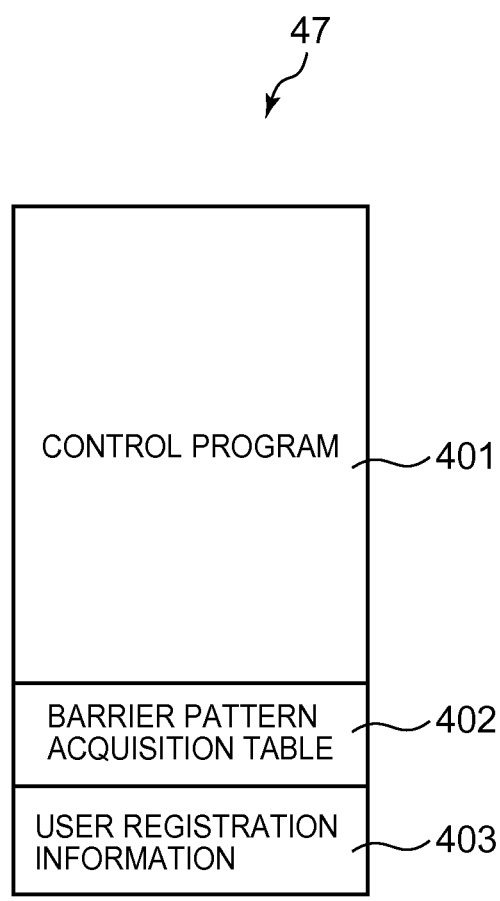
FIG. 7 is a conceptual diagram showing memory data of a program memory unit.

The program memory unit 47 is a nonvolatile memory such as a flash memory, for example, in which data can be rewritten. As shown in FIG. 7, the program memory unit 47 stores the aforementioned control program 401 with which the control unit 42 controls the operation of each of the display control unit 4; a barrier pattern acquisition table 402; and user registration information 403. In addition, while it is not shown in the figures, the program memory unit 47 also stores data of test pattern images which are later described.

The barrier pattern acquisition table 402 is a table containing a variety of barrier patterns that enable a three-dimensional view of a 3D image displayed on the display module 2 for various visible distances. As shown in FIG. 8, the barrier pattern acquisition table 402 contains various visible distance levels. For each of the visible distance levels, the table 402 contains an appropriate slit width and an appropriate barrier width for that visible distance level. Here, one "visible distance level" represents a range of visible distance at which the corresponding slit width and barrier width are appropriate or optimized for a three-dimensional viewing. The slit width and the barrier width contained in the barrier pattern acquisition table 402 are being provided to the barrier data generation unit 44 as the barrier pattern information.

The barrier width in the barrier pattern acquisition table 402 is the width of each barrier region Xa of the parallax barrier X, shown as B in the FIG. 4B, and the slit width in the barrier pattern acquisition table 402 is the width of each slit region Xb of the parallax barrier X, shown as W in the FIG. 4B.

In this example, the visible distance levels in the barrier pattern acquisition table 402 have n-levels of visible distance (from the position of the viewer's eyes to the surface of the display module 2) at the time of use of the display device 1. The range of the visible distance for each visible distance level (L1 to Ln) is determined by the width of the barrier element Xn in the barrier control device 3 shown in FIG. 3B—that is, by the resolution of the parallax barrier X displayed by the barrier control device 3. Of the visible distance levels (L1 to Ln), the range of distance corresponding to the greatest visible distance level (Ln) is the range whose upper limit is the predetermined design optimum distance, and the range of distance corresponding to the smallest visible distance level (L1) is the range whose lower limit is the predetermined minimum distance.

Here, the optimum distance and the minimum distance are calculated based on the pupillary distance, the width of the sub-pixel 2a of the display module 2, and the distance between the display module 2 and the parallax barrier X displayed by the barrier control device 3, assuming that the viewer's pupillary distance (the distance between the centers of left eye and right eye) takes a typical value (for example, an average pupillary distance for adults), Conditions I to III in FIG. 9 are diagrams showing a slit width and a barrier width of barrier patterns for different visible distance levels, respectively. More specifically, the Condition I in FIG. 9 is a diagram showing a parallax barrier XA having a barrier pattern specified by the slit width (Wn) and the barrier width (Bn) for the largest visible distance level (Ln) that includes the optimum visible distance. The Condition III in the FIG. 9 is a diagram showing a parallax barrier XC having a barrier pattern specified by the slit width (W1) and the barrier width (B1) for the lowest visible distance level (L1) that includes the minimum visible distance. The Condition II in the FIG. 9 is a diagram showing a parallax barrier XB having a barrier pattern specified by the slit width (Wm) and the barrier width (Bm) for an intermediate visible distance level that includes a distance positioned somewhere between the optimum visible distance and the minimum visible distance.

As shown in the Conditions I to III of FIG. 9, among the slit widths contained in the barrier pattern acquisition table 402, the largest is the slit width (Wn) for the highest visible distance level (Ln), and the smallest is the slit width (W1) for the lowest visible distance level (L1). On the other hand, among the barrier widths contained in the barrier pattern acquisition table 402, the smallest is the barrier width (Bn) for the highest visible distance level (Ln), and the largest is the barrier width (B1) for the lowest visible distance level (L1). Also, among the barrier patterns for various visible distance levels, the interval at which the slit region Xb repeat itself becomes largest for the highest visible distance level (Ln) and becomes smallest for the lowest visible distance level (L1).

Therefore, as shown in the Conditions I to III of FIG. 9, the ratio of the total area of the slit region Xb to the total area of the parallax barrier—that is, the aperture ratio of the parallax barrier—is highest for the highest visible distance level (Ln). Further, the closer the visible distance is with respect to the display module 2, the lower the aperture ratio of the parallax barrier becomes.

Here, the slit width (Wn) of the parallax barrier XA for the highest visible distance level (Ln) that includes the optimum visible distance is nearly the same as the width of the sub-pixel 2a of the display module 2. Also, the barrier width (Bn) of the parallax barrier XA is about twice as large as the width of the sub-pixel 2a.

The values of the slit width and the barrier width for each visible distance level are determined such that a 3D image can be viewed three-dimensionally by the viewer when the distance between the viewer and the display module 2 belongs to the corresponding visible distance level. More specifically, as shown as the Conditions I to III in the FIG. 10, the values for the slit width and the barrier width for a visible distance level are determined such that when the viewer M views a 3D image from a distance belonging to that visible distance level, the right eye image R is visible substantially only through the right eye of the viewer M, while the left eye image L is visible substantially only through the left eye of the viewer M.

The Conditions I to III shown in FIG. 10 correspond respectively to the Conditions I to III in FIG. 9. In other words, the Condition I in FIG. 10 is a diagram showing the relationship between the parallax barrier XA and the viewer M's lines of sight when the visible distance D1 is the optimum visible distance. The Condition III in the FIG. 10 is a diagram showing the relationship between the parallax barrier XC and the viewer M's lines of sight when the visible distance D3 is the minimum visible distance. The Condition II in the FIG. 10 is a diagram showing the relationship between the parallax barrier XB and the viewer M's lines of sight when the visible distance D2 is an intermediate distance located somewhere between the optimum distance and the minimum distance.

Here, as shown in the Condition I of FIG. 10, the design optimum visible distance (D1) is the distance at which the entire area of each of the sub-pixels constructing the pixels of the right eye image can be viewed by the right eye of the viewer M, and the entire area of each of the sub-pixels constructing the pixels of the left eye image can be viewed by the left eye of the viewer M.

Referring to FIG. 11, the user registration information 403, which is stored in the program memory unit 47, is data relating to one or more users registered in the display device 1 and contains data shown in FIG. 11. More specifically, the user registration information 403 contains such data as a registration number to be used for identifying the user, face image data which are data for an image of the user's face, and an offset distance.

The face image data are image data which are extracted from image data obtained by the stereo camera unit 6 (data of the right image or the left image). The offset distance is correction data which are used to correct (increase or decrease) the visible distance calculated by the distance calculation unit 46 when the user specified by the registration number is a viewer. Note that the face image data correspond to the registered image in the present embodiment. The offset distance corresponds to the correction information of the present embodiment. The memory unit of the present embodiment is realized by the program memory unit 47.

Figure 15:
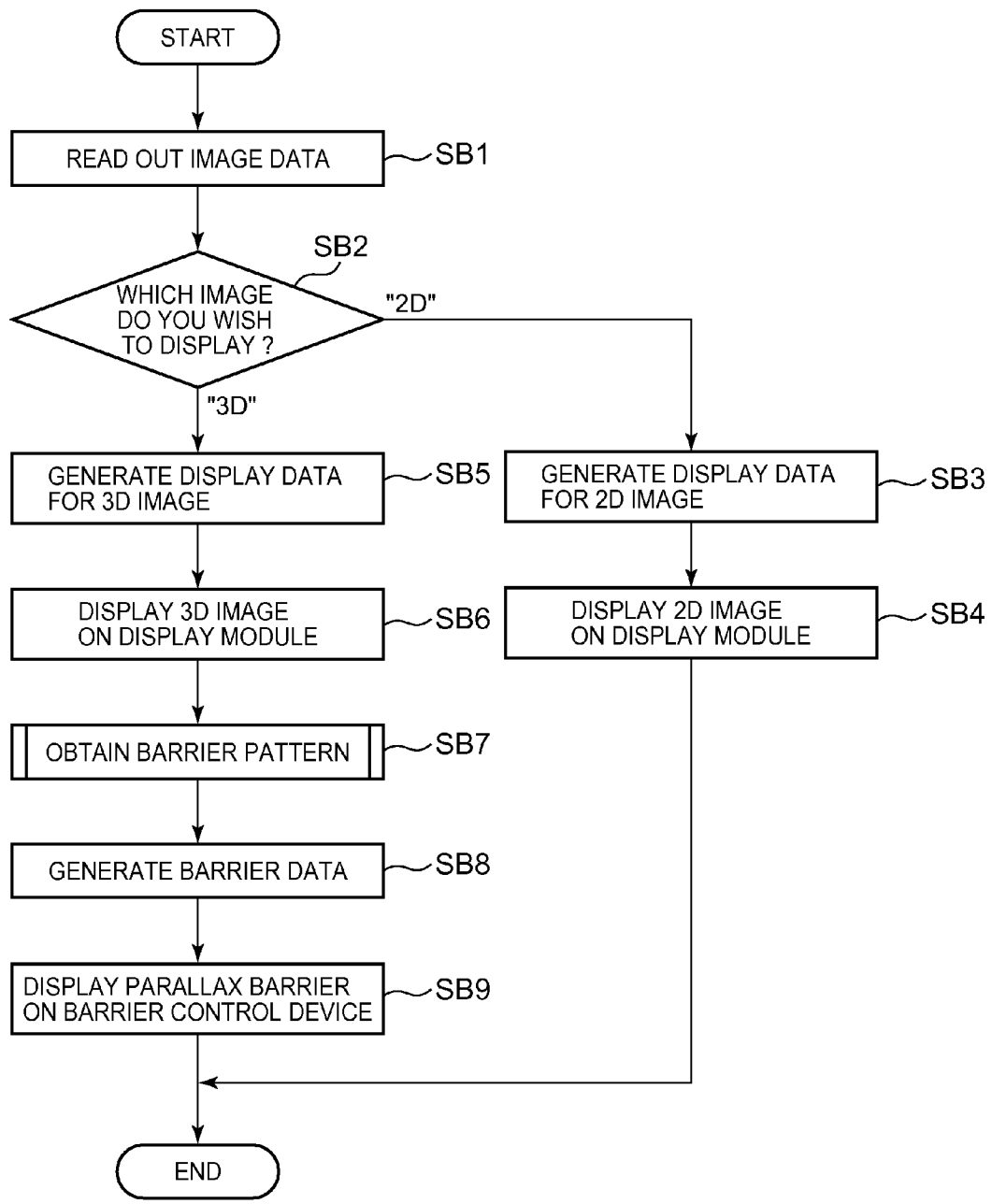
FIG. 15 is a flowchart showing an image display processing.
Figure 16:
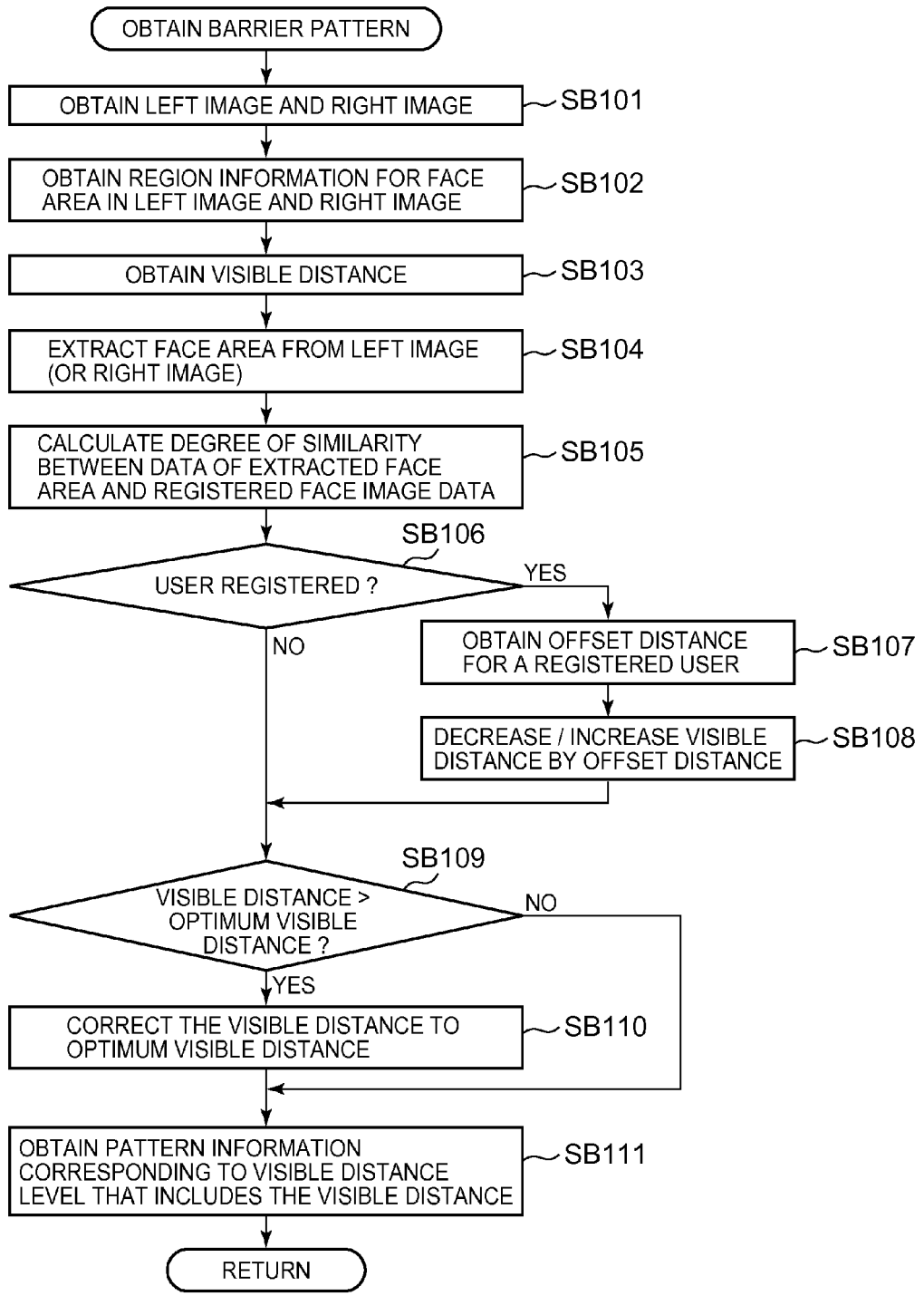
FIG. 16 is a flowchart showing a barrier pattern acquisition processing.

In the display control unit 4, the control unit 42 performs processes shown in FIGS. 12, 15, and 16 according to the above-mentioned control program, controlling the operation of the display module 2, the barrier control device 3, and the stereo camera unit 6. Below is the description of the contents of the processes performed by the control unit 42.

(User Registration Process)

FIG. 12 is a flowchart showing the contents of the user registration process, which the control unit 42 performs when a user registers information on herself/himself in the display device 1, that is, conducting a user registration. Here, when performing the user registration process, the control unit 42 functions as part or entirety of the distance acquisition control unit, the imaging control unit, the correction information acquisition unit, and the memory control unit of the present embodiment.

In the user registration process, the control unit 42 first reads out data of a test pattern image, which is a preprogrammed 3D image, from the program memory unit 47, and then provides the readout data to the display data generation unit 43, thereby causing the display data generation unit 43 to generate the display data of the test pattern image (step SA1).

Next, the control unit 42 drives the display module 2 by providing the display data generated by the display data generation unit 43 to the display module 2, thereby causing the display module 2 to display the test pattern image. More specifically, by treating three different-colored sub-pixels 2a in the display module 2 as a set, which are indicated as R1, G1, B1 in the FIG. 3A, the control unit 42 controls the gradation level of each sub-pixel 2a according to the color of pixels, to which each set of the sub-pixels 2a corresponds, of a right eye image (or a left eye image) constructing the test pattern image. At the same time, by treating three different-colored sub-pixels 2a in the display module 2 as a set, which are indicated as R2, G2, B2 in the FIG. 3A, the control unit 42 also controls the gradation level of each sub-pixel 2a according to the color of pixels, to which each set of the sub-pixels 2a corresponds, of a left eye image (or right eye image) constructing the test pattern image. As a result, the control unit 42 divides the right eye image and the left eye image (which together constitute the test pattern image) into a plurality of vertical stripes, as shown in FIG. 4B, and alternately displays the stripes of the right eye image and the stripes of the left eye image in the horizontal direction at the interval of sub-pixel 2a.

Further, the control unit 42 causes the barrier data generation unit 44 to generate barrier data corresponding to the optimum visible distance (step SA3). In this process, the control unit 42 reads out pattern information corresponding to the optimum visible distance, that is, the slit width (Wn) and the barrier width (Bn) corresponding to the highest viewable distance level (Ln), from the aforementioned barrier pattern acquisition table 402 (see FIG. 8). Next, the control unit 42 provides the readout pattern information to the barrier data generation unit 44, thereby causing the barrier data generation unit 44 to generate barrier data corresponding to the optimum visible distance.

Next, the control unit 42 provides barrier data generated by the barrier data generation unit 44 as the previously described drive signals (drive signals needed for the driver element to drive the liquid crystal) to the barrier control device 3, thereby causing the barrier control device 3 to display a parallax barrier having a barrier pattern corresponding to the optimum visible distance (step SA4). In other words, the control unit 42 causes the barrier control device 3 to display the parallax barrier XA, which has the slit width (Wn) and the barrier width (Bn) for the optimum visible distance that is shown as a Condition I in FIG. 9.

Next, at step SA5, a user moves its viewing position to find out a distance from the display module 2 at which the user determines that the quality of 3 dimensional viewing of the test pattern is optimum. The control unit 42 confirms whether or not the user has executed an operation to determine such an optimum visible position by detecting whether the designated switch(es) of the operation unit 41 (or some other form of interaction) is operated by the user. Thus, once the user has moved his/her face (eyes) to a position from which the test pattern image can be viewed three-dimensionally in its best condition, the user operates the operation unit 41 (or some other form of user interface) to notify the display apparatus 1 that he/she has found the best distance.

The control unit 42 repeatedly attempts to confirm whether or not such operation has been executed (step SA5: NO) until it receives the input from the user indicating that the operation to determine the optimum visible position has indeed been executed. After confirming that such operation has been indeed executed (step SA5: YES), the control unit 42 causes the stereo camera unit 6 to take an left-eye image and an right-eye image of the user as a subject (step SA6).

Figure 13A:
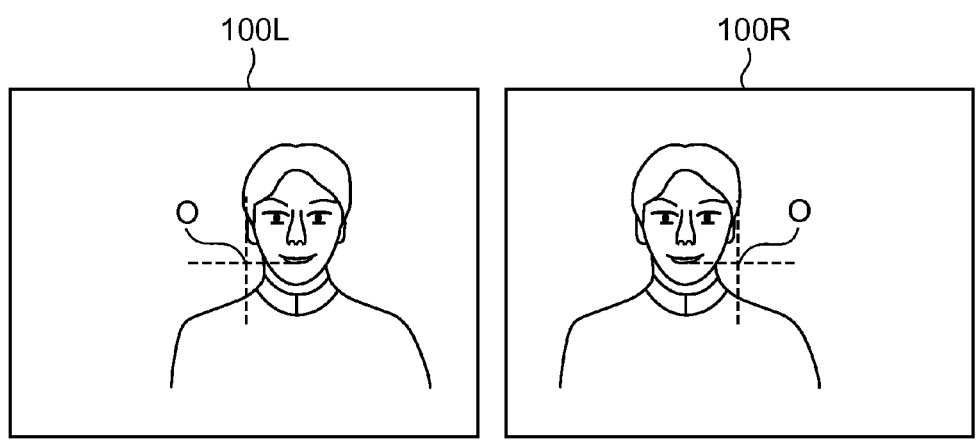
FIG. 13A is an illustration showing an example of a left-eye image and a right-eye image taken by a stereo camera unit.

FIG. 13A shows an example of the left image 100L and the right image 100R obtained by the control unit 42 through the step SA6. Here, the position indicated as "O" in FIG. 13A is the center of the left image 100 and the right image 100, respectively, showing that there exists a parallax in the horizontal direction.

Figure 13B:
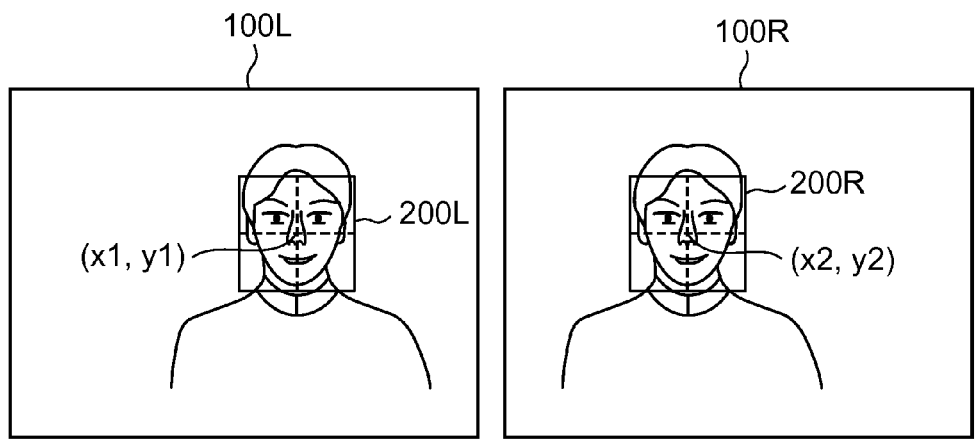
FIG. 13B is an illustration showing an example of a left image and a right image taken by a stereo camera unit.

Next, the control unit 42 provides the obtained data of the right image and the left image to the face detection unit 45, causes the face detection unit 45 to perform the face detection processing, and obtains from the face detection unit 45 region information (coordinate information) that indicates the face area of the user in the right image and the left image, respectively (step SA7). FIG. 13B shows an example of the face area region 200L in the left image 100L and the face area region 200R in the right image 100R, which are determined by the face detection unit 45 during the processing of step SA7.

Subsequently, the control unit 42 provides the obtained region information of the left image 100L and the right image 100R to the distance calculation unit 46 and causes the distance calculation unit 46 to calculate the distance between the display module 2 and the user (the viewer), thereby obtaining the visible distance from which the user was able to view the test pattern image three-dimensionally in its best condition (step SA8).

Figure 14:
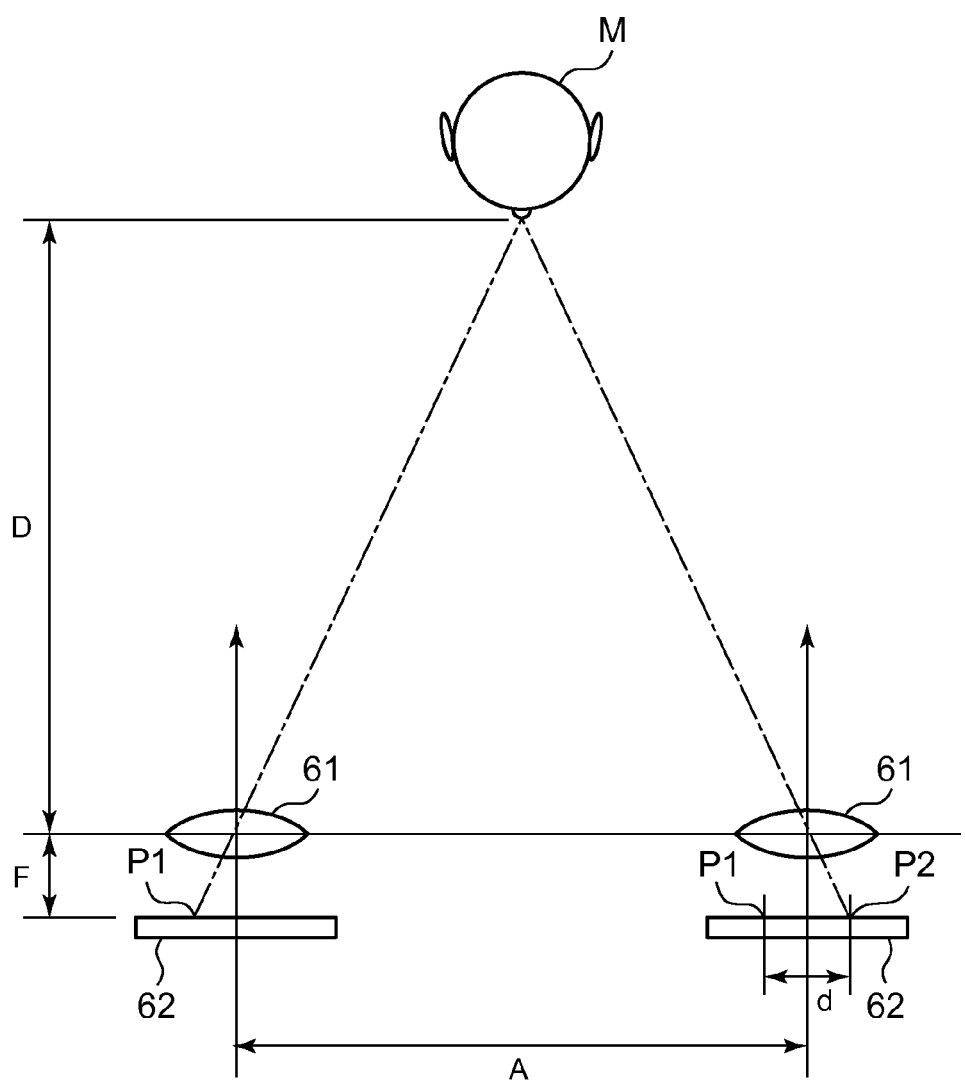
FIG. 14 is an illustration showing a principle of acquisition of a visible distance.

Here, a method used by the distance calculation unit 46 for calculating the visible distance is described as follows. The method which is used by the distance calculation unit 46 is based on the principle of triangulation. FIG. 14 is an illustration showing the principle for acquiring the visible distance.

In FIG. 14, the reference "D" indicates a visible distance which shall be calculated by the distance calculation unit 46 and which corresponds to a distance between the imaging lenses 61, 61 of the stereo camera unit 6 and the user M. The reference "d" indicates a parallax existing between the left image 100L and the right image 100R. More specifically, the parallax d is a differential in the positions (distance) of feature points P1, P2 of the left image 100L and the right image 100R, respectively, on the imaging surfaces of the respective imaging devices 62, 62. With these parameters, the relationship expressed by the following equation (1) is true between the visible distance D and the parallax d:

$$D = F \times A / d \quad (1)$$

Here, A is a distance between the two imaging devices 62, 62, and F is the focal length of the imaging lenses 61, 61. Since both A and F are already known, the visible distance D can be calculated uniquely if the parallax d between the left image 100L and the right image 100R is found.

The distance calculation unit 46 calculates the visible distance D by the following process, which is based on the aforementioned principle. First, the distance calculation unit 46 acquires the coordinate position (x1, y1) of the center of the face area region 200L in the left image 100L and the coordinate position (x2, y2) of the center of the face area region 200R in the right image 100R, as shown in FIG. 13B, and regards these coordinate positions as the coordinate positions of the feature points P1, P2, respectively, which are shown in FIG. 14. Next, the distance calculation unit 46 calculates the parallax d between the left image 100 L and the right image 100R based on the thus acquired coordinate positions of the feature points P1 and P2, i.e., (x1, y1) and (x2, y2). Then, the distance calculation unit 46 calculates the visible distance D using the above equation (1).

Meanwhile, after obtaining the visible distance D through the processing of step SA8, the control unit 42 calculates a difference between the obtained visible distance D, which is the actual distance from which the user could view the test pattern image three-dimensionally in its best condition, and the preprogrammed design optimum visible distance (or default optimum visible distance) to derive an offset distance as a result of the calculation (step SA9).

Here, the offset distance is a positive value when the visible distance D is longer than the design optimum distance and is a negative value when the visible distance D is shorter than the design optimum distance. Note that the difference between the visible distance D and the optimum distance occurs when, for example, the user's pupillary distance differs from the typical pupillary distance that was used in determining the design optimum visible distance. Therefore, the offset distance reflects individual differences among the users.

Subsequently, from the left image 100L (or from the right image 100R) obtained through the processing of step SA6, the control unit 42 extracts the face region 200L indicated by the aforementioned region information (step SA10). Then, the control unit 42 stores, in the program memory unit 47, the image data as user registration information 403 by associating the image data of the extracted face region 200L with a new registration number together with the offset distance obtained through step SA9 (step SA11). This completes the user registration process.

(Image Display Processing)

FIG. 15 is a flowchart showing the contents of the image display process performed by the control unit 42 in regard to displaying an image based on image data stored in the image memory 5. Note that when performing the image display processing, the control unit 42 functions as part or whole of a slit width control unit, an identification unit, a readout unit, and a correction unit of the present embodiment, and at the same time, functions as a barrier pattern control unit and also a barrier width control unit of the present embodiment. Also, an image to be displayed is an image selected by the user by operating the designated switches or interface of the operation unit 41, for example.

In the image display process, the control unit 42 first reads out data of an image to be displayed from the image memory 5 (step SB1). The control unit 42 then determines whether the image to be displayed is a 2D image or a 3D image every time it reads out data in a predetermined unit from the image memory 5. When the image to be displayed is a 2D image (step SB2: "2D"), the control unit 42 provides the image data read out from the image memory 5 to the display data generation unit 43 and directs the display data generation unit 43 to generate the display data of the 2D image (step SB3).

Next, by providing the display data of the 2D image generated by the display data generation unit 43 to the display module 2, the control unit 42 drives the display module 2 and causes the display module 2 to display the 2D image (step SB4). More specifically, by treating six sub-pixels 2a in the display module 2 as a set, which are indicated as R1, R2, G1, G2, B1, B2 in the FIG. 3A, the control unit 42 controls the gradation level of each sub-pixel 2a according to the color of the pixel of the 2D image to which each set of the sub-pixels 2a corresponds, and maintains the same gradation level for two same-colored adjacent sub-pixels 2a, 2a in each set of the sub-pixels. As a result, the control unit 42 causes the display module 2 to display the 2D image as shown in FIG. 4A.

When the image to be displayed is a 3D image (step SB2: "3D"), the control unit 42 provides the image data read out from the image memory 5, that is, the image data of the right eye image and left eye image, to the display data generation unit 43, and causes the display data generation unit 43 to generate display data of the 3D image (step SB 5). Next, the control unit 42 causes the display module 2 to display the 3D image by providing the display data of the 3D image generated by the display data generation unit 43 to the display module 2. More specifically, as shown in FIG. 4B, the control unit 42 displays the right eye image and the left eye image by dividing the images into a plurality of vertical stripes and by alternately displaying the vertical stripes of the right eye image and left eye image in the horizontal direction.

Subsequently, the control unit 42 obtains barrier pattern information by performing a barrier pattern acquisition step shown in FIG. 16 (step SB7). The following is a description of the barrier pattern acquisition process.

In the barrier pattern acquisition processing, the control unit 42 first causes the stereo camera unit 6 to take a left eye image and a right eye image of the viewer as subject (step SB101). Next, the control unit 42 provides the face detection unit 45 with the obtained data of the right image and the left image and causes the face detection unit 45 to perform the face detection processing, thereby obtaining the region information (coordinate information) indicating the user's face areas in the right image and the left image (step SB 102), respectively. Further, the control unit 42 provides the distance calculation unit 46 with the obtained region information of the left eye image and the right eye image, and the distance calculation unit 46 determines a distance at which the user is located relative to the position of the panel module 2 based on the supplied region information of the left image and right eye image (step SB103). Note that in this example, the processes performed in step SB101 through step SB103 are the same as the processes for step SA6 through step SA8 in the above-described user registration process.

Subsequently, from the left eye image (or from the right eye image) obtained through the processing of step SB101, the control unit 42 extracts the face area indicated by the region information obtained by the face detection unit 45 (step SB104). Next, by scanning the image data of pre-registered face data stored as the user registration information 403 (see FIG. 11), the control unit 42 calculates the degree of similarity between the stored face image data and the image data of the face area extracted in step SB104 (step SB105) for each of the preregistered face data. In calculating the degree of similarity, the control unit 42 calculates the degree of similarity for multiple feature points, such as the size of or the relative positions between eyes, nose, or mouth, of two targeted face image data, for example, and derives the final degree of similarity by averaging the degrees of similarity for the multiple feature points, for example. Note that the processes in step SB104 and step SB105 correspond to the face recognition process in the present embodiment.

Next, the control unit 42 determines whether or not the current viewer is a registered user by determining whether there exists any face image data stored as the user registration information 403 that has a higher-than-threshold degree of similarity relative to the image data of the extracted face area (step SN106). In other words, the control unit 42 determines whether the current viewer is a registered user or an unregistered user.

More specifically, the control unit 42 determines that the current user is not registered when no face image data in the user registration information 403 has a higher-than-threshold degree of similarity with the image data of the extracted face area. On the other hand, the control unit 42 determines that the current user is registered when an image data that has a higher-than-threshold degree of similarity with the image data of the extracted face area is found in the user registration information 403.

When the control unit 42 determines that the current viewer is not registered as a user (step SB106: NO), the control unit 42 immediately proceeds to the processing of step SB109, which is later described. When the control unit 42 determines that the current viewer is registered as a user (step SB106: YES), the control unit 42 performs the following process.

First, from the user registration information 403, the control unit 42 obtains the offset distance for the registered user, that is, the offset distance corresponding to the face image data having the aforementioned degree of similarity that is higher than the preset threshold value and that is also the highest (step SB107).

Next, the control unit 42 corrects the actual visible distance obtained through step SB103 by deducting the offset distance therefrom (step SB108). More specifically, the control unit 42 decreases the actual visible distance obtained through step SB103 by the offset distance amount when the offset distance is a positive value (which means that the optimum visible distance for the current viewer—i.e., the distance from which the viewer can view the 3D image three-dimensionally in its best condition, which has been already confirmed at the time of the user registration, is greater than the design optimum visible distance). On the other hand, the control unit 42 increases the actual visible distance obtained through step SB103 by the offset distance amount when the offset distance is a negative value (which means that the optimum visible distance for the current viewer—i.e., the distance from which the viewer can view the 3D image three-dimensionally in its best condition, which has already been confirmed at the time of the user registration, is smaller than the design optimum visible distance). Subsequently, the control unit 42 proceeds to the processing of step SB109.

Next, in the processing of step SB109, the control unit 42 confirms whether the visible distance obtained through the processing of step SB103, or the visible distance corrected through the processing of step SB108, is greater than the design optimum visible distance. (step SB109).

When the visible distance is shorter than the optimum distance (step SB109: NO), the control unit 42 immediately obtains from the barrier pattern acquisition table 402 (see FIG. 8) the pattern information (the slit width and the barrier width) corresponding to a visible distance level that includes the visible distance (step SB111), thereby completing the barrier pattern acquisition process.

When the visible distance is longer than the optimum distance (step SB109: YES), the control unit 42 corrects the visible distance to be the optimum distance (step SB110) and obtains from the barrier pattern acquisition table (see FIG. 8) the pattern information (the slit width and the barrier width) corresponding to a visible distance level that includes the optimum distance (step SB111), thereby completing the barrier pattern acquisition process.

Then, the control unit 42 returns to the processing shown in FIG. 15, provides the barrier data generation unit 44 with the pattern information (the slit width and the barrier width) obtained through the barrier pattern acquisition process, and causes the barrier data generation unit 44 to generate the barrier data according to the visible distance obtained through the barrier pattern acquisition process (step SB8). By providing the barrier control device 3 with the barrier data generated by the barrier data generation unit 44, the control unit 42 causes the barrier control device 3 to display a parallax barrier having the barrier pattern for the visible distance (step SB9), thereby completing the image display process.

Note that the control unit 42 controls the display module 2 and the barrier control device 3 so that the display of the 3D image by the display module 2 and the display of the barrier pattern by the barrier control device 3 are performed simultaneously.

As described above, according to the display device 1 of the present embodiment, in displaying a 3D image on the display module 2, the display control unit 4 first obtains the distance between the surface of the display module 2 and the viewer, i.e., the actual visible distance. When the measured actual visible distance (as corrected by the individualized information as described above, if needed) is shorter than the design optimum visible distance, the display control unit 4 produces a barrier pattern of the parallax barrier displayed by the barrier control device 3 having appropriate slit width and barrier width in accordance with the actual visible distance, thereby making a three-dimensional view of the 3D image possible.

Therefore, according to the display device 1, it is possible to make the pixels of the right eye image R only visible to the right eye of the viewer M and the pixels of the left eye image L only visible to the left eye of the viewer M even if the actual visible distance deviates from the design optimum visible distance (FIG. 10). As a result, it is possible to enlarge the range of distance between the viewer and the displayed image (the display module 2) from which the viewer can view a 3D image three-dimensionally.

Since the display control 4 controls the barrier pattern according to the actual visible distance, the parallax barrier's slit width becomes narrower as the actual visible distance becomes shorter than the design optimum visible distance. Thus, the visible area of each sub-pixel viewed through each slit of the parallax barrier becomes narrower (see FIG. 10). In other words, the shorter the actual visible distance is than the design optimum visible distance, the lower the aperture ratio of the parallax barrier becomes. This makes the display brightness of the 3D image lower automatically.

Therefore, in case that the viewer views a 3D image from the position at a shorter distance than the optimum visible distance, it is possible for the display device 1 to have the viewer view the 3D image in good condition by automatically adjusting the display brightness of the 3D image according to the visible distance. In other words, when the viewing position is closer to the display module 2, it is possible for the display device 1 to have the viewer view the 3D image without experiencing excessive brightness.

Also, according to the display device 1 of the present embodiment, if the viewer has been registered as a user, the display control unit 4 determines a barrier pattern using the aforementioned process to control the barrier pattern of the parallax barrier based on the actual measured distance to the user. In other words, the display control unit 4 first corrects the actual visible distance according to the preprogrammed offset distance unique to the user, and determines the barrier pattern that corresponds to the corrected visible distance.

Therefore, when the viewer is a registered user, even if the optimum visible distance for the particular viewer differs from the design optimum visible distance, the display device 1 can have the viewer view the 3D image three-dimensionally in good condition at all times without requiring the viewer to adjust the position of his/her face (eyes) in the forward/backward direction every time the viewer uses the display device 1.

There are various possible modifications to the above-described structure of the display device 1 of the present embodiment. In the above example, the control unit 42 of the display control unit 4 is designed to control the barrier pattern of the parallax barrier during the image display processing when the distance between the surface of the display module 2 and the viewer—i.e., the actual visible distance—is equal to or shorter than the design optimum visible distance. However, the control unit 42 may alternatively be configured to control the barrier pattern of the parallax barrier according to the actual visible distance even when the actual visible distance is greater than the design optimum visible distance.

As compared with such modified example, in the display device of the above-described embodiment, the control unit 42 of the display control unit 4 controls the barrier pattern of the parallax barrier when the measured actual visible distance (as corrected by Step SB108, if applicable) is equal to or shorter than the design optimum visible distance, and the control unit 42 maintains the barrier pattern of the parallax barrier at the barrier pattern that corresponds to the design optimum visible distance when the measured actual visible distance (as corrected by Step SB108, if applicable) exceeds the design optimum visible distance, thereby creating the following advantages.

In the above-described modified example, in order for the control unit 42 to perform the image display processing as mentioned above, it is necessary to change the barrier pattern acquisition table 402 to include barrier patterns (i.e., data for each of the slit widths and the barrier widths) of the parallax barrier for visible distances greater than the design optimum visible distance. For these barrier patterns, the slit width must be made narrower, and the barrier width must be made wider because the corresponding visible distances are greater than the design optimum visible distance. In other words, the aperture rate of the parallax barrier decreases as the visible distance becomes greater than the design optimum visible distance. Therefore, the display brightness of the 3D image would decrease as the visible distance becomes greater beyond the design optimum visible distance.

In contrast, according to the above-described embodiment, when the measured actual visible distance (as corrected by step SB108, if applicable) is greater than the design optimum visible distance, the control unit 42 maintains the barrier pattern of the parallax barrier at the barrier pattern corresponding to the design optimum visible distance. Therefore, according to the present embodiment, it is possible to maintain the display brightness of the 3D image at the same level when the actual visible distance is greater than the design optimum visible distance.

Also, according to the present embodiment, in the barrier pattern acquisition process, the control unit 42 acquires a barrier pattern (the slit width and the barrier width) for the actual visible distance from the barrier pattern acquisition table 402. In the alternative, the control unit 42 may be configured to derive the barrier pattern for the actual visible distance by calculation instead of using the table 402.

Also, in the above examples of the display device 1, the display module 2 possesses a color combination in which a pair of horizontally-adjacent sub-pixels 2a, 2a are assigned with the same color designated according to a color pattern that includes six colors, namely, R, R, G, G, B, B, as one set. However, the display module 2 may be modified to have the following color combination. For example, the display module 2 may have a color combination in which each sub-pixel is assigned with a color designated according to a color pattern that includes three vertically-aligned colors, namely, R, G, B, as a set; that is, three vertically-aligned sub-pixels are assigned respectively with one of each color of R, G, B.

However, when the display module 2 has such a color combination, when displaying a 3D image on the display module 2, the display data generation unit 43 of the display control unit 4 needs to generate the following display data. Specifically, the display data generation unit 43 needs to generate the display data according to which each pixel of the right eye image and of the left eye image is allocated to the three-color (R, G, B) sub-pixels which are aligned in a vertical direction of the display module 2. And the display data should be such that the display module 2 displays the right eye image and the left eye image by dividing them in a plurality of vertical stripes and by alternately arranging them in the horizontal direction.

In the above-described examples, the display device 1 has a structure in which a distance between the surface of the display module 2 and the viewer—i.e., the measured actual visible distance—is obtained based on the principle of triangulation using the right image and the left image taken by the stereo camera unit 6. However, the structure for deriving the actual visible distance as well as the specific method to calculate the visible distance may be modified, or a different scheme may be used, as long as a reasonable accuracy is achieved for the measured actual visible distance and if such needs arise.

Also, the present invention is not limited to the above-mentioned particular display device 1, and can be applicable to any arbitrary display device having a display function for three-dimensional images (3D images) using a parallax barrier system. Note that such arbitrary display devices may encompass a variety of information processing devices having an image display function, such as mobile phones.

In the above-described embodiments, the distance between the display module 2 and the barrier control device 3 is fixed. However, the distance between the display module 2 and the barrier control device 3 may be configured to be variable. This feature provides additional advantages of allowing the viewer to view images three-dimensionally at the wide range of the visible distances. Appropriate mechanical structure and control scheme can be provided to control the distance between the display module 2 and the barrier control device 3 in accordance with the measured actual distance to the viewer instead of or in addition to the adjustment of the pattern of the parallax barrier described above. In such a case, a barrier pattern acquisition table 402 of the above examples may be appropriately modified to include a plurality of tables for a variety of the possible distances between the display module 2 and the barrier control device 3, for example. Alternatively, the control unit 42 can calculate an appropriate pattern of the parallax barrier and appropriate distance between the display module 2 and the barrier control device 3 based on the measured distance between the display nodule 2 and the viewer by appropriate software algorithm, for example.

Further, the distance between the display unit and a viewer viewing the display device can be continuously monitored and the pattern of the slit in the parallax barrier may be adjusted in accordance with the continuously monitored distance to the viewer in substantially real time so that even if the viewer moves around the display device, he/she can keep viewing the images three-dimensionally in good condition.

It will be apparent to those skilled in the art that various modification and variations can be made to the present invention without departing from the spirit or scope of the invention. Thus, it is intended that the present invention cover modifications and variations that come within the scope of the appended claims and their equivalents.

What is claimed is:

1. A display device comprising:
   a display unit that displays a left eye image and a right eye image by dividing the images thereof into a plurality of vertically elongated stripes of images and by alternately arranging the divided left eye image and the divided right eye image in a horizontal direction;
   a barrier formation unit that forms a parallax barrier in front of the display unit;
   an imaging unit that captures a right image and a left image of the viewer as a subject in order to generate region information corresponding to face image data of the viewer, the region information indicating a face area of a user in the right image of the viewer and in the left image of the viewer that are respectively captured by at least a left lens and a right lens of a stereoscopic camera unit of the imaging unit;
   a distance information acquisition unit that derives distance information according to the region information of the imaging unit, the region information indicating a distance between the display unit and a viewer viewing the display unit; and
   a slit width control unit that controls a slit width of the parallax barrier formed by the barrier formation unit in accordance with said distance indicated by the distance information obtained by the distance information acquisition unit.

2. The display device according to claim 1, wherein the slit width control unit changes the slit width of the parallax barrier formed by the barrier formation unit in accordance with the distance indicated by the distance information calculated by the distance information acquisition unit, and
   wherein there exists a maximum slit width beyond which the slit width control unit does not increase the slit width of the parallax barrier, the maximum slit width corresponding to a predetermined distance.

3. The display device according to claim 2, wherein the slit width control unit decreases the slit width of the parallax barrier in accordance with the distance indicated by the distance information obtained by the distance information acquisition unit as compared with the maximum slit width when the distance indicated by the distance information obtained by the distance information acquisition unit is smaller than the predetermined distance.

4. The display device according to claim 2, wherein the predetermined distance is a design viewing distance from which an entire area of the left eye image is visible to a left eye of the viewer and an entire area of the right eye image is visible to a right eye of the viewer.

5. The display device according to claim 1, wherein the display unit is a dot matrix display unit comprising a plurality of display elements, and
   wherein the display unit displays the left eye image and the right eye image by alternatively arranging the stripes of left eye image and the stripes of the right eye image using the display elements as a unit in the horizontal direction.

6. The display device according to claim 1, wherein the display unit includes adjacently disposed two display elements having a color component equal to each other, and
   wherein one of the two display elements is assigned to the left eye image and the other of the two display elements is assigned to the right eye image.

7. The display device according to claim 1, further comprising:
   a memory unit that stores a registered image of a preregistered user including at least a face area and correction information for the preregistered user;
   an identification unit that determines whether or not the viewer is the preregistered user by performing a face recognition processing including a comparison between the face area of the viewer on the subject image taken by the imaging unit and the registered image of the preregistered user stored in the memory unit;
   a readout unit that, when the identification unit determines that the view is the preregistered user, reads out from the memory unit the correction information for the viewer identified by the identification unit as the preregistered user; and
   a correction unit that corrects the distance indicated by the distance information obtained by the distance information acquisition unit based on the correction information read out by the readout unit.

8. The display device according to claim 7, wherein the slit width control unit controls the slit width of the parallax barrier formed by the barrier formation unit in accordance with the distance that has been corrected by the correction unit.

9. The display device according to claim 7, further comprising:
   a distance acquisition control unit that causes the distance information acquisition unit to obtain distance information indicating a distance between the display unit and the viewer at which the viewer indicates to the display device that it can view a test three-dimensional image displayed on the display unit with a designated parallax barrier in its best condition;
   a correction information acquisition unit that obtains a difference between the distance indicated by the distance information obtained by the distance information acquisition unit under the control of the distance acquisition control unit and a predetermined design visible distance for the test pattern as correction information for the viewer; and
   a memory control unit that stores the correction information calculated by the correction information calculation unit in the memory unit.

10. The display device according to claim 1, wherein the barrier formation unit forms the parallax barrier when a 3D display is selected and does not form the parallax barrier when a 2D display is selected.

11. A display device comprising:
    a display unit displaying a left eye image and a right eye image by dividing the images thereof into a plurality of vertically elongated stripes of images and by alternately arranging the divided left eye image and the divided right eye image in a horizontal direction;
a barrier formation unit forming a parallax barrier in front of the display unit; a memory unit that stores a registered image of a preregistered user including at least a face area and correction information for the preregistered user;
an imaging unit that captures a right image and a left image of a viewer as a subject in order to generate region information corresponding to face image data of the viewer, the region information indicating a face area of a user in the right image of the viewer and in the left image of the viewer that are respectively captured by at least a left lens and a right lens of a stereoscopic camera unit of the imaging unit;
an identification unit that identifies whether or not the viewer is the preregistered user by performing a face recognition processing including a comparison between the face area of the viewer on the subject image taken by the imaging unit and the registered image stored in the memory unit;
a readout unit that reads out from the memory unit the correction information for the viewer identified by the identification unit as the preregistered user; and a slit width control unit that controls a slit width of the parallax barrier formed by the barrier formation unit in accordance with the correction information read out by the readout unit.

12. A display device comprising:
a display unit displaying a left eye image and a right eye image by dividing the images thereof into a plurality of vertically elongated stripes of images and by alternately arranging the divided left eye image and the divided right eye image in a horizontal direction;
a barrier formation unit forming a parallax barrier in front of the display unit;
an imaging unit that captures a right image and a left image of a viewer as a subject in order to generate region information corresponding to face image data of the viewer, the region information indicating a face area of a user in the right image of the viewer and in the left image of the viewer that are respectively captured by at least a left lens and a right lens of a stereoscopic camera unit of the imaging unit;
a distance information acquisition unit obtaining distance information according to the region information of the imaging unit, the region information indicating a distance between the display unit and a viewer viewing the display unit; and
a barrier pattern control unit controlling a barrier pattern of the parallax barrier formed by the barrier formation unit to be at a designated barrier pattern having the slit width corresponding to the distance indicated by the distance information obtained by the distance information acquisition unit.

13. A display device comprising:
a display unit displaying a left eye image and a right eye image by dividing the images thereof into a plurality of vertically elongated stripes of images and by alternately arranging the divided left eye image and the divided right eye image in a horizontal direction;
a barrier formation unit that forms a parallax barrier in front of the display unit;
a distance information acquisition unit that obtains distance information according to the region information of an imaging unit including a stereoscopic camera unit having at least a left lens and a right lens, the distance information indicating a distance between the display unit and a viewer viewing the display unit, the region information indicating a face area of a user in a right image of the viewer and in a left image of the viewer that are respectively captured by the left lens and the right lens of a stereoscopic camera unit; and
a barrier width control unit that controls a barrier width of the parallax barrier formed by the barrier formation unit to be at the barrier width for the distance indicated by the distance information obtained by the distance information acquisition unit.

14. A method for controlling a parallax barrier for a three dimensional display, comprising:
obtaining distance information indicating a distance between a display unit that displays a left eye image and a right eye image by dividing the images thereof into a plurality of vertically elongated stripes and by alternately arranging the divided left eye image and the divided right eye image in a horizontal direction, and a viewer viewing the display unit; and
controlling a slit width of a parallax barrier formed in front of the display unit according to the distance indicated by the distance information,
wherein the distance information is derived according to region information corresponding to face image data of the viewer, the region information indicating a face area of a user in a right image of the viewer and in a left image of the viewer that are respectively captured by at least a left lens and a right lens of a stereoscopic camera unit.

15. A three-dimensional display device comprising:
a display unit that displays a left eye image and a right eye image by dividing the images thereof into a plurality of vertically elongated stripes of images and by alternately arranging the divided left eye image and the divided right eye image in a horizontal direction;
a barrier formation unit that forms a parallax barrier in front of the display unit, the parallax barrier including a pattern of a plurality of slits to selectively transmit the left eye image and the right eye image towards spatially different points, respectively, that correspond to a left eye and a right eye of a viewer viewing the display unit;
an imaging unit that captures a right image and a left image of the viewer as a subject in order to generate region information corresponding to face image data of the viewer, the region information indicating a face area of a user in the right image of the viewer and in the left image of the viewer that are respectively captured by at least a left lens and a right lens of a stereoscopic camera unit of the imaging unit; and
a distance measurement unit that measures a distance between the display unit and the viewer according to the region information of the imaging unit,
wherein the barrier formation unit adjusts the pattern of the slits in the parallax barrier in accordance with the distance measured by the distance measurement unit.

16. The three-dimensional display device according to claim 15, wherein the distance measurement unit continuously monitors the distance between the display unit and a viewer viewing the display unit, and
wherein the barrier formation unit adjusts the pattern of the slits in the parallax barrier in accordance with the continuously monitored distance in substantially real time.

17. A three-dimensional display device comprising:
a display unit that displays a left eye image and a right eye image by dividing the images thereof into a plurality of vertically elongated stripes of images and by alternately arranging the divided left eye image and the divided right eye image in a horizontal direction;

a barrier formation unit that forms a parallax barrier in front of the display unit, the parallax barrier including a pattern of a plurality of slits to selectively transmit the left eye image and the right eye image towards spatially different points, respectively, that correspond to a left eye and a right eye of a viewer viewing the display unit;

an imaging unit that captures a right image and a left image of the viewer as a subject in order to generate region information corresponding to face image data of the viewer, the region information indicating a face area of a user in the right image of the viewer and in the left image of the viewer that are respectively captured by at least a left lens and a right lens of a stereoscopic camera unit of the imaging unit; and a distance measurement unit that measures a distance between the display unit and the viewer according to the region information of the imaging unit, wherein at least one of a distance between the barrier formation unit and the display unit and the pattern of the slits in the parallax barrier is adjusted in accordance with the distance to the viewer measured by the distance measurement unit.

* * * * *